United States Patent
Kataoka et al.

(10) Patent No.: US 7,457,221 B2
(45) Date of Patent: Nov. 25, 2008

(54) OPTICAL DISC RECORDING/REPRODUCTION DEVICE

(75) Inventors: Takeyoshi Kataoka, Yokohama (JP); Motoyuki Suzuki, Yokohama (JP); Fumio Isshiki, Yokohama (JP); Yoshinori Ishikawa, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 602 days.

(21) Appl. No.: 11/139,382

(22) Filed: May 27, 2005

(65) Prior Publication Data

US 2006/0104183 A1     May 18, 2006

(30) Foreign Application Priority Data

Nov. 11, 2004    (JP)    ............... 2004-327470

(51) Int. Cl.
   *G11B 7/00*    (2006.01)
(52) U.S. Cl. ............................... 369/112.01; 369/44.32
(58) Field of Classification Search .............. 369/44.32, 369/44.23, 44.24, 112.01, 112.02, 94, 53.35, 369/53.38, 44.25, 44.26
   See application file for complete search history.

(56) References Cited

U.S. PATENT DOCUMENTS 7,307,927 B2 * 12/2007 Fujita et al. ............... 369/44.29

2004/0196766 A1    10/2004 Tadano

FOREIGN PATENT DOCUMENTS

| JP | 2000-011388 | 1/2000 |
|----|-------------|--------|
| JP | 2001-222838 | 8/2001 |
| JP | 2003-123282 | 4/2003 |
| JP | 2003-123333 | 4/2003 |

* cited by examiner

*Primary Examiner*—Nabil Z Hindi
(74) *Attorney, Agent, or Firm*—Townsend and Townsend and Crew LLP

(57) ABSTRACT

There is provided an optical disc recording/reproduction device capable of accurately performing the focus offset and spherical aberration correction even for an optical disc having no data recorded. The optical disc recording/reproduction device includes: an optical pickup having a spherical aberration corrector for correcting the spherical aberration of an objective lens; and various control units; and can generate a tracking error signal (TE) at least by a push-pull signal by the push-pull method. When an optical disc mounted is in an unrecorded state, the spherical aberration correction amount and the objective lens focus offset amount are adjusted according to the push-pull signal, predetermined data is recorded on the optical disc, and the reproduction signal obtained by the data is used to adjust the spherical aberration correction amount in the spherical aberration corrector of the optical pickup and the focus offset amount of the objective lens.

10 Claims, 13 Drawing Sheets

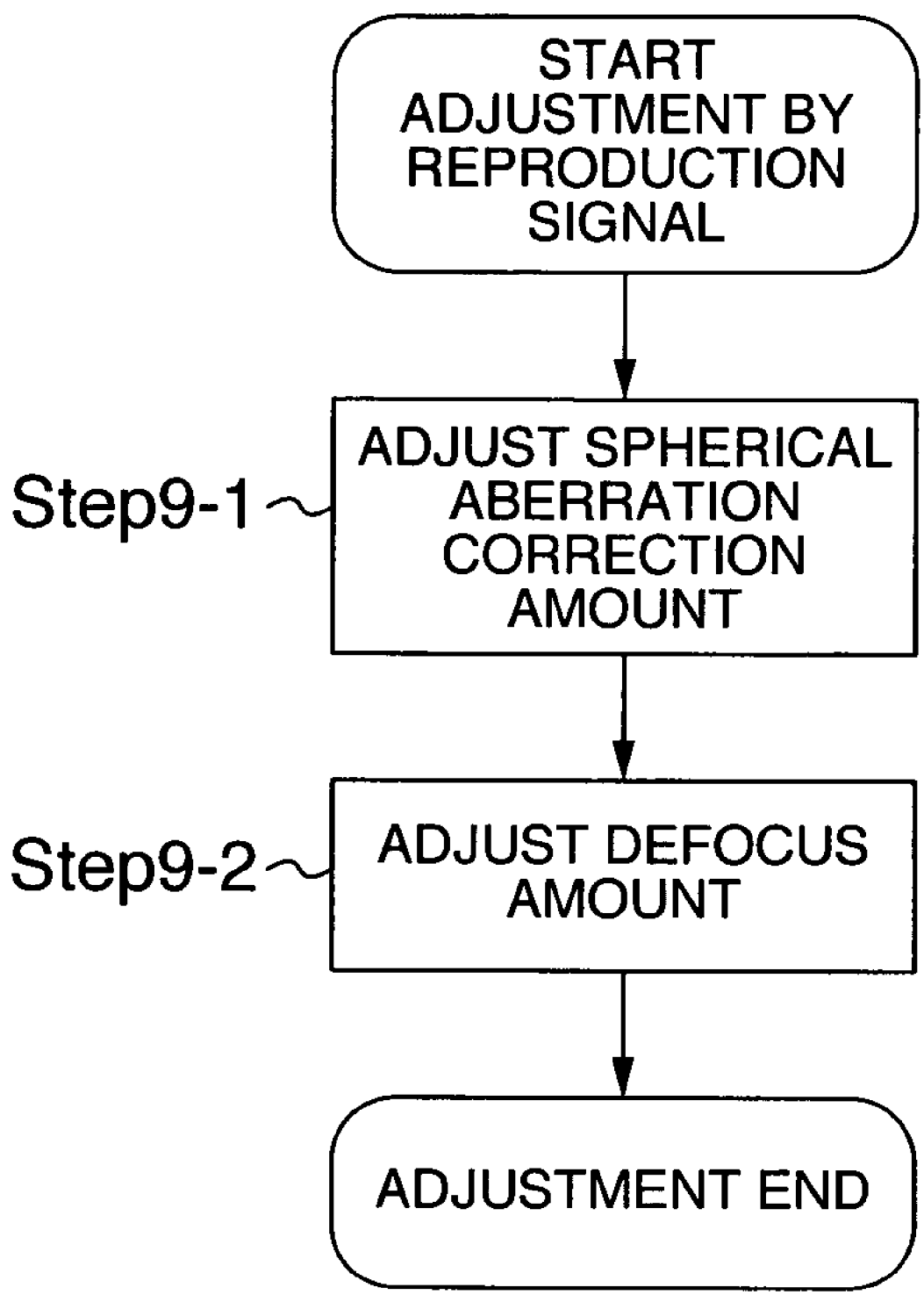

OPTICAL DISC RECORDING/REPRODUCTION DEVICE

INCORPORATION BY REFERENCE

The present application claims priority from Japanese application JP2004-327470 filed on Nov. 11, 2004, the content of which is hereby incorporated by reference into this application.

BACKGROUND OF THE INVENTION

1. Field of the Invention

The present invention relates to an optical disc recording/reproduction device for optical disc recording/reproducing for recording/reproducing information onto/from an optical disc and in particular, to an optical disc recording/reproducing device capable of surely executing focus offset adjustment and spherical aberration correction adjustment regardless of the state of an optical disc mounted.

2. Description of the Related Art

For example, an optical disc recording/reproduction device for recording and/or reproducing data onto/from an optical disc as a disc-shaped optical information recording medium such as a CD and DVD is a data recording/reproduction device characterized in that it can access data at a high speed in non-contact way, with large capacity, and at low cost. By these characteristics, for example, it is widely used as a recording/reproduction device of recording/reproduction device of digital audio data and digital moving picture data or a computer external storage device.

Moreover, recently, the data amount which can be handled by an optical disc such as a CD and DVD has been increased and their density is increased. It should be noted that the data recording density of the optical disc is limited by a device for recording/reproducing information onto/from a disc and especially whether light collection is enabled onto the information recording surface of the optical disc and the size of the optical spot. The size of the optical spot is proportional to the wavelength of the optical flux and inversely proportional to the NA (numerical aperture). Accordingly, in order to increase the density of the optical disc, it is necessary to shorten the wavelength of the light flux generating the optical spot and increase the NA of an objective lens.

In general, when the wavelength of the light flux is shortened and the NA of the objective lens is increased, the affect of aberration is increased. When an aberration is generated in the optical system for generating an optical spot, the optical spot obtained is too large. Especially, the spherical aberration SA is expressed by the following expression:

$$SA \propto \frac{\Delta T \cdot NA^4}{\lambda} \quad \text{(Expression)}$$

wherein "$\Delta T$" is an error of the optical disc substrate thickness (hereinafter, referred to "substrate thickness error) and "$\lambda$" is a wavelength of the optical flux.

That is, the expression above shows that the spherical aberration is increased in proportion to power 4 of NA of the objective lens and the disc substrate thickness error $\Delta T$, and inverse proportion to the wavelength $\lambda$ of the optical flux.

Moreover, in an optical disc having an information recording layer formed by two or more layers, a spherical aberration is generated by the interval error between the information recording layers in the same way as the aforementioned substrate thickness error. Accordingly, in the optical disc having a multi-layer structure, it is also necessary to correct the spherical aberration generated by the interval error between a plurality of recording layers.

Conventionally, as an optical pickup configuration capable of correcting such a spherical aberration, for example, there are known a configuration having a beam expander for adding a predetermined spherical aberration into the optical path of optical flux, a configuration having a liquid crystal element for giving a predetermined spherical aberration, or a configuration for giving spherical aberration by changing the interval of two objective lenses in pair in the focusing direction. Moreover, JP-A-2000-011388 and JP-A-2001-222838 disclose a technique to compensate the spherical aberration generated due to the substrate thickness error and the interval error between the information recording layers by using the optical pickup having the aforementioned configuration to intentionally generate spherical aberration.

SUMMARY OF THE INVENTION

In the technique of JP-A-2000-11388, adjustment of a focus offset (defocus) amount is executed by changing the reproduction signal amplitude obtained when actually reproducing data recorded on the optical disc. However, in order to correct the spherical aberration by using such an adjustment method, some data should be recorded on the information recording surface (layer) of the optical disc.

Moreover, in addition to JP-A-2000-11388, in the technique of JP-A-2001-222838 also, focus offset (defocus) and spherical aberration correction is executed by using the data reproduction signal amplitude or both of the data reproduction signal amplitude and the tracking error signal amplitude. For this, like the aforementioned, in order to correct the spherical aberration, some data should be recorded on the information recording surface (layer) of the optical disc. That is, a necessary reproduction signal cannot be obtained from an optical disc having no data and it is impossible to perform correction of the spherical aberration.

It is therefore an object of the present invention to provide an optical disc recording/reproduction device capable of surely executing adjustment of focus offset (defocus) for an optical disc containing data as well as an optical disc not containing data and especially correction of the spherical aberration required when the wavelength of optical flux is shortened due to recent increase of density of the optical disc.

According to the present invention, in order to achieve the aforementioned object, firstly, there is provided an optical disc recording/reproduction device including: an optical pickup having an objective lens for collecting light flux onto an optical disc and forming an optical spot, a photo-detector for detecting a light flux reflected from the optical disc, an actuator for moving the objective lens, and a spherical aberration corrector for correcting a spherical aberration of the objective lens; means for generating a reproduction signal and a tracking error signal serving as data from an output signal from the photo-detector of the optical pickup; spherical aberration corrector drive means for driving the spherical aberration corrector, of the optical pickup; and actuator drive means for driving the actuator of the optical pickup; wherein the tracking error signal generation means is adapted to be able to at least generate the tracking error signal by a push-pull signal based on the push-pull method. The optical disc recording/reproduction device further includes: first adjustment means for adjusting a spherical aberration correction amount in the spherical aberration corrector of the optical pickup and a focus offset amount of the objective lens according to the tracking error signal formed by the push-pull signal; and second adjustment means used after adjustment of the spherical aberration and the focus offset by the first adjustment means, for recording predetermined data on the optical disc and adjusting the spherical aberration correction amount in the spherical aberration corrector of the optical pickup and the focus offset amount of the objective lens according to the reproduction signal of the data recorded.

According to another aspect of the present invention, the optical disc recording/reproduction device further includes means for judging whether the optical disc is an unrecorded disc or not. When the optical disc is judged to be an unrecorded disc by the judging means, after the spherical aberration and focus offset adjustment by the fist adjustment means, it is preferable that predetermined data be recorded on the optical disc, and the second adjustment means adjusts the spherical aberration correction amount in the spherical aberration corrector of the optical pickup and the focus offset of the objective lens according to the reproduction signal of the recorded data.

According to still another aspect of the present invention, the optical disc recording/reproduction device preferably further includes means for detecting amplitudes of the reproduction signal and the tracking error signal. Furthermore, the second adjustment means preferably adjusts the spherical aberration correction amount in the spherical aberration corrector of the optical pickup and the focus offset amount of the objective lens so that the amplitude of the tracking error signal formed by the push-pull signal detected by the amplitude detection means becomes maximum. Alternatively, the first adjustment means preferably adjusts the spherical aberration correction amount in the spherical aberration corrector of the optical pickup and the focus offset amount of the objective lens so that the amplitude of the tracking error signal formed by the push-pull signal detected by the amplitude detection means becomes maximum.

According to yet another aspect of the present invention, in the optical disc recording/reproduction device, the first adjustment means preferably adjusts the spherical aberration correction amount and the focus offset amount by measuring the amplitude of the tracking error signal formed by the push-pull signal while modifying the amounts according to a predetermined profile of the optical disc.

According to still yet another aspect of the present invention, the optical disc recording/reproduction device, further includes means for storing characteristics for the defocus amount and the spherical aberration correction amount associated with the amplitude of the tracking error signal formed by the push-pull signal, so that the characteristic is used when the first adjustment means adjusts the spherical aberration and the focus offset. Furthermore, the characteristic is preferably an inclination of the spherical aberration correction amount with respect to the defocus amount on the straight line at which the amplitude of the tracking error signal obtained from the push-pull signal becomes maximum. Moreover, the inclination as the characteristic is stored or updated in the storage means upon shipment of the device. In this invention, when the optical disc recording/reproduction device includes, in addition to the track area for recording data onto the optical disc medium, a separate track area of a track pitch multiplied by 1.05 to 2 as compared to the track pitch of the track where the data is recorded, the first adjustment means performs adjustment in this separate track area.

As has been described above, according to the present invention, even when a high-density optical disc mounted is in a unrecorded state, by using the reproduction signal of the data recorded on the optical disc in adjustment using a detectable push-pull signal, adjustment of the spherical aberration correction amount and the focus offset is performed. Thus, it is possible to provide an excellent optical disc recording/reproduction device in which regardless of whether the optical disc mounted is in an unrecorded state, adjustment of the focus offset (defocus) is performed and additionally, it is possible to correct the spherical aberration which is required when the light flux has a short wavelength due to the recent increase of density of the optical disc.

Other objects, features and advantages of the invention will become apparent from the following description of the embodiments of the invention taken in conjunction with the accompanying drawings.

BRIEF DESCRIPTION OF THE DRAWINGS

FIG. 15 is a flowchart showing an adjustment algorithm by the reproduction signal in the modified example 2 shown in FIG. 14.

DESCRIPTION OF THE EMBODIMENTS

Description will now be described to the embodiments of the present invention with reference to the attached drawings in details.

Figure 1:
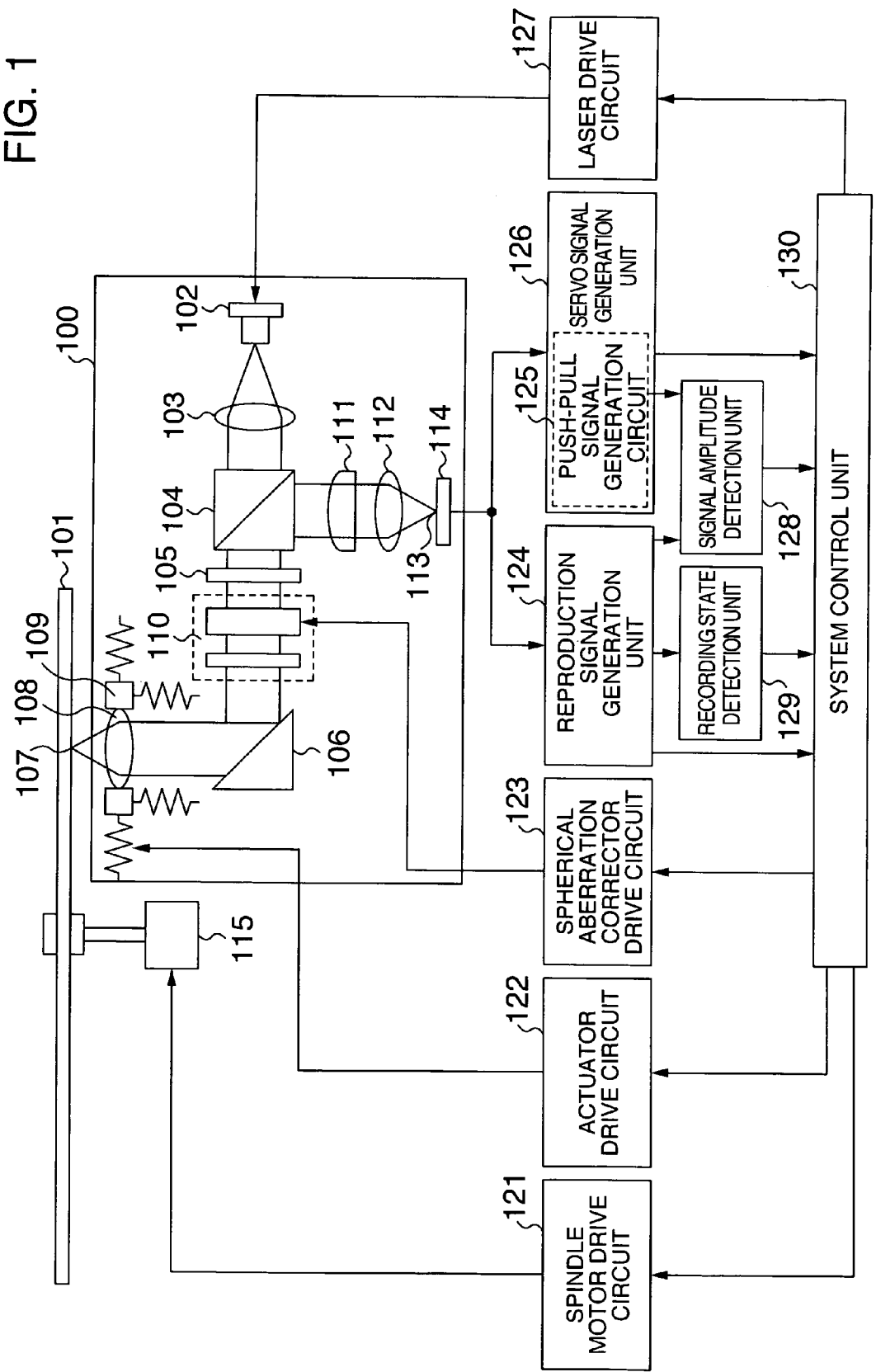
FIG. 1 is a block diagram showing a brief configuration of an optical disc recording/reproduction device according to an embodiment of the present invention.

FIG. 1 is a block diagram showing configuration of an optical disc recording/reproduction device according to the present invention and its optical pickup. In FIG. 1, a reference symbol 100 denotes an optical pickup; an optical disc 101; a semiconductor laser 102; a collimating lens 103; a polarizing beam splitter 104; a quarter-wave plate 105; a mirror 106; an optical spot 107; an objective lens 108; an actuator 109; a spherical aberration corrector 110; a cylindrical lens 111; a condenser 112; a reflected light spot 113; a photodetector 114; a spindle motor 115; a spindle motor drive circuit 121; an actuator drive circuit 122; a spherical aberration corrector drive circuit 123; a reproduction signal generation unit 124; a push-pull signal generation unit 125; a servo signal generation unit 126; a laser drive circuit 127; a signal amplitude detection unit 128; a recording state judgment unit 129; and a system control unit 130 are shown.

Moreover, the aforementioned optical pickup 100 includes: a semiconductor laser 102 for emitting a laser light flux for recording/reproducing an information signal onto/from the optical disc 101; a collimating lens 103 for converting the light flux emitted from the semiconductor laser into a parallel light flux; a so-called polarizing beam splitter 104 almost transmitting a predetermined linear polarization light and almost reflecting a linear polarization light orthogonally intersecting the linear polarization light; a quarter-wave plate 105 for converting the linear polarization light into circular polarization light or converting the circular polarization light into linear polarization light; a total reflection mirror 106; an objective lens 108 for focusing the light flux from the mirror 106 to an optical spot 107 with a predetermined NA onto the information recording layer of the optical disc 1; an actuator 109 for displacing the objective lens 108 in the focus direction and the tracking direction; a spherical aberration corrector 110 for adjusting the spherical aberration of the light flux incident into the objective lens 108 and correcting the spherical aberration of the optical spot 107 generated by the substrate thickness error, etc. of the optical disc 101; a cylindrical lens 111 and a condenser 112 through which the reflected light flux from the optical disc passes after being reflected by the polarization beam splitter 103; and a photodetector 114 for finally outputting an electric signal based on the intensity change of the reflected light spot 113.

With configuration of the aforementioned optical pickup 100, the light flux emitted from the semiconductor laser 102 is converted into a parallel light flux by the collimating lens 103 and only a light linearly polarized into a predetermined direction is transmitted through the polarizing beam splitter 104 and converted into a circularly polarized light by the quarter-wave plate 105. The circularly polarized light is added with a predetermined spherical aberration by the spherical aberration corrector 110 and then reflected by the mirror 106 and introduced to the objective lens 108. The objective lens 108 forms an optical spot 107 on the information recording layer of the optical disc 101 according to the incident light flux.

Moreover, the light reflected from the optical disc 101 passes again through the objective lens 108, the mirror 106, and the spherical aberration corrector 110, after which the light is converted by the quarter-wave plate 105 into a linear polarized light orthogonal to the linearly polarized light which is emitted from the semiconductor laser 102. For this, most of the reflected light flux from the optical disc 101 is reflected by the polarizing beam splitter 104. The reflected light flux passes through the cylindrical lens 111 and is focused onto a predetermined reflection light spot by the condenser 112, after which the light flux is introduced to the photodetector 114.

Here, the aforementioned spherical aberration corrector 110 is formed, for example, by a combination of two lenses at a variable distance. The distance between the lenses is changed by a drive signal from the spherical aberration corrector drive circuit 123 so as to adjust the spherical aberration of the transmitting light flux, thereby constituting a so-called beam expander. However, in this invention, the spherical aberration corrector is not to be limited to this but may be, for example, a liquid crystal element capable of correcting spherical aberration by giving a phase difference between the inner circumference and an outer circumference of the light flux.

The electric signal outputted from the photodetector 114 is supplied to a reproduction signal generation unit 124 and a servo signal generator 126. The reproduction signal generation unit 124 generates a reproduction signal of information (reproduction information signal) recorded on the optical disc 101 while the servo signal generation unit 126 generates signals for servo control such as a focus error signal and a tracking error signal. Here, in this invention, the tracking error signal is generated by the push-pull method which can also be detected even when no data is recorded on the disc.

Figure 2:
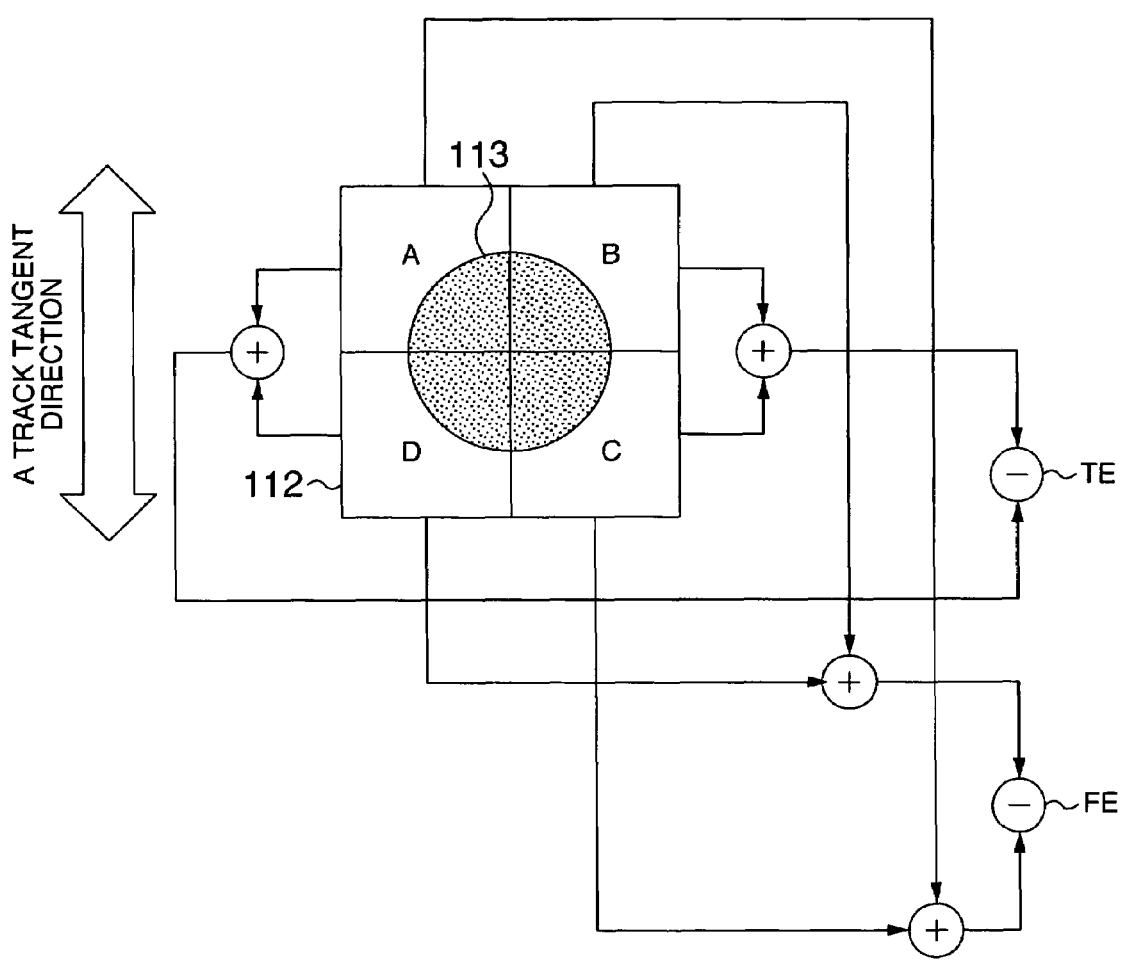
FIG. 2 explains generation a servo signal in the optical pickup of the optical disc recording/reproduction device of FIG. 1.

Next, FIG. 2 explains a method for detecting a tracking error signal together with a focus error signal in the servo signal generation unit 126 by the aforementioned push-pull method (especially, the push-pull signal generation unit 125).

In FIG. 2, the reflected light spot 113 is formed on the light reception surface of the photodetector 112. It should be noted that as is clear from the figure, the photodetector 112 is formed by a so-called 4 divided photodefector having four light reception areas A, B, C, D obtained by dividing the light reception surface by two division lines parallel to the tangential direction and the radial direction of the track of the optical disc 101. By this photodetector 112, the following servo signals are detected from the light reception quantity of each area.

Firstly, the tracking error signal is detected by Equation 1 as follows:

$$TE=(A+D)-(B+C) \quad \text{(Equation 1)}$$

Next, the focus error signal is detected by Equation 2 as follows by the 4 divided photodetector 112 and the cylindrical lens 111 by using the astigmatic method:

$$FE=(A+C)-(B+D) \quad \text{(Equation 2)}$$

Moreover, the signal amplitude detection unit 128 in FIG. 1 detects the amplitudes of the reproduction signal generated by the reproduction signal generation unit 124 and the push-pull signal generated by the push-pull signal generation unit 125 in the servo signal generation unit 126. The recording state judgment unit 129 judged whether data is recorded on the optical disc 101 mounted on the spindle motor 115 according to the reproduction signal from the reproduction signal generation unit 124.

It should be noted that the system control unit 130 is formed, for example, by a CPU, which has the function to control the entire optical disc device. That is, the spindle motor drive circuit 121 controls rotation of the optical disc 101 mounted on the spindle motor 115 and the actuator drive circuit 122 drives the actuator 109. Thus, the objective lens 108 is moved to execute focus control and tracking control. Moreover, the system control unit 130 causes the spherical aberration corrector drive circuit 123 to drive the spherical aberration corrector 110 to correct the spherical aberration and further causes the laser drive circuit 127 to drive the semiconductor laser 102 to emit a laser beam. Additionally, the system control unit 130 performs correction of the spherical aberration. A specific method for correcting the spherical aberration will be detailed later.

As has been described above, a signal from the push-pull signal generation unit 125 arranged in the servo signal generation unit 126 is inputted to the signal amplitude detection unit 128. Especially, the amplitude of the push-pull signal generated when no tracking servo is applied is detected by the signal amplitude detection unit 128 and the amplitude information is supplied to the system control unit 130. Moreover, the reproduction signal generation unit 124 generates a reproduction signal of the information recorded on the optical disc 101. The signal amplitude detection unit 128 detects especially the amplitude of the reproduction signal when tracking servo is applied so that the optical spot follows the track where data is recorded, and the amplitude information is supplied to the system control unit 130.

Figure 3:
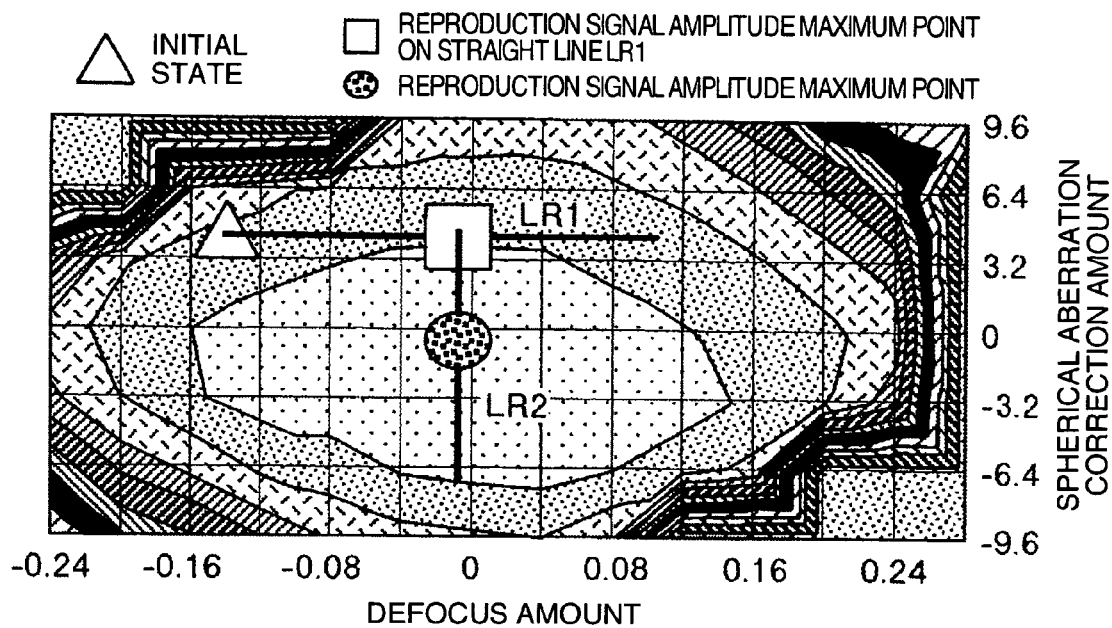
FIG. 3 shows characteristic curves associated with the defocus amount of the reproduction signal amplitude and the spherical aberration correction amount.

Subsequently, FIG. 3 shows characteristic curves (profile) associated with the spherical aberration correction amount and the defocus amount of the reproduction signal amplitude detected by the signal amplitude detection unit 128, for the reproduction signal from the reproduction signal generation unit 124. In FIG. 3, the horizontal axis represents a defocus amount. The defocus amount means a correction amount of focal depth which is an offset amount of the focal depth from the focused state (the focus error signal is 0) to defocus state (the focus error signal is not 0). When the objective lens 108 is defocused in the direction toward the optical disc 101, the state is called "in focus". On the contrary, when the objective lens 108 is defocused in the direction away from the optical disc 101, the state is called "out focus". Moreover, the focused state is called "just focus".

On the other hand, the vertical axis in FIG. 3 represents the spherical aberration correction amount added by the spherical aberration corrector 110 which is converted into a substrate thickness error. It should be noted that the contour lines in the figure represent reproduction signal amplitudes. The inner areas surrounded by the contour lines have greater amplitudes.

From the characteristic curves in FIG. 3, it is known that the contour lines of the reproduction signal amplitudes are almost symmetric around the center where the amplitude becomes maximum (center portion in the figure) with respect to the defocus amount and the spherical aberration correction amount.

Figure 4:
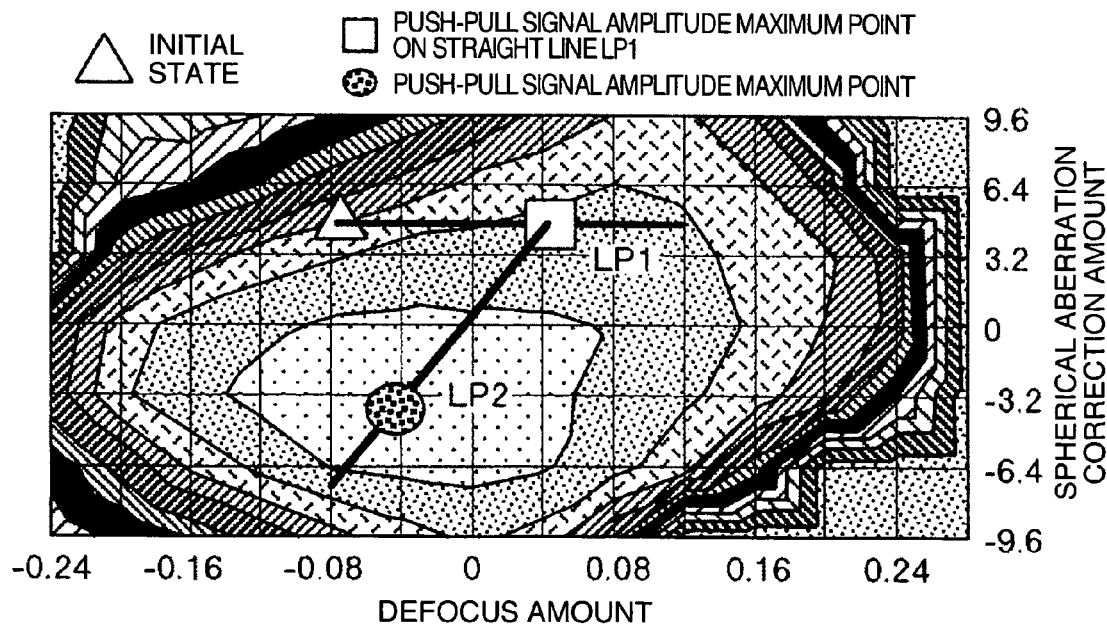
FIG. 4 shows characteristic curves associated with the defocus amount of the push-pull signal amplitude and the spherical aberration correction amount.

Next, FIG. 4 shows characteristic curves (profile) associated with the spherical aberration correction amount and the defocus amount of the push-pull signal amplitude when no tracking servo detected by the signal amplitude detection unit 128 is applied to the push-pull signal generated by the push-pull signal generation unit 125 arranged in the servo signal generation unit 126. It should be noted that similarly as in FIG. 3, the horizontal axis and the vertical axis in FIG. 4 represent the defocus amount and the spherical aberration correction amount. Moreover, in this figure also, the inner contour lines indicate greater push-pull signal amplitudes.

From the characteristic curves (profile) of FIG. 4, it can be known that the position where the push-pull signal amplitude is maximum is different from the just focus position (the defocus amount is 0) and the amplitude is maximum where the spherical aberration amount is not 0. Furthermore, unlike FIG. 3, the contour lines of the push-pull signal amplitude is not symmetric around the center where the amplitude is in the maximum state with respect to the defocus amount and the spherical aberration correction amount. That is, the straight line indicating the maximum value with respect to the defocus amount is inclined by a predetermined angle.

It should be noted that in the configuration of the optical disc recording/reproduction device according to the present invention shown in FIG. 1, the system control unit 130 uses the aforementioned amplitude characteristics of the two signals in performing (rough) adjustment of the spherical aberration correction and the defocus amount according to the aberration correction step which will be detailed later.

Next, explanation will be given on the basic procedure of the aberration correction step executed by the system control unit 130 according to the flowchart of FIG. 5. It should be noted that the procedure shown in this figure indicates an initial adjustment learning operation of the spherical aberration correction.

When the processing starts, in step 1-1, firstly, focus servo is applied so that the optical spot is focused on the recording surface and in step 1-2, the recording state judgment unit 128 judges whether the disc 101 mounted is an unrecorded disc or a disc on which data has been recorded.

Here, if the step 1-2 judges that the disc mounted is an unrecorded disc ("Yes" in the Figure) where no reproduction signal can be obtained from the disc, then go to step 1-3, where the (rough) adjustment by the amplitude information on the push-pull signal (hereinafter, referred to as "push-pull signal amplitude adjustment") is performed. After this, in step 1-4, the tracking servo is applied and, data is written in step 1-5. Then, go to step 1-8 where adjustment by the amplitude of the reproduction signal which will be detailed below is performed.

On the other hand, if step 1-2 judges that the disc mounted has data recorded ("No" in the figure) where a reproduction signal can be obtained from the disc, then go to step 1-6, where the optical spot is moved to the area where the data is recorded. Furthermore, in step 1-7, the tracking servo is applied and after this, proceed to step 1-8 for adjustment by the amplitude of the reproduction signal which will be detailed below.

After the step 1-5 or the step 1-7, the step 1-8 performs the adjustment by the amplitude information on the reproduction signal (hereinafter, referred to as "the reproduction signal amplitude adjustment"), thereby complete the initial adjustment learning of the spherical aberration correction. As is clear from the aforementioned, the reproduction signal amplitude adjustment is enabled regardless of the difference of the data recording state, i.e., whether the disc 101 mounted is an unrecorded disc or a disc containing data recorded.

Furthermore, explanation will be given on the aberration correction step especially when the disc mounted is an unrecorded disc.

Figure 5:
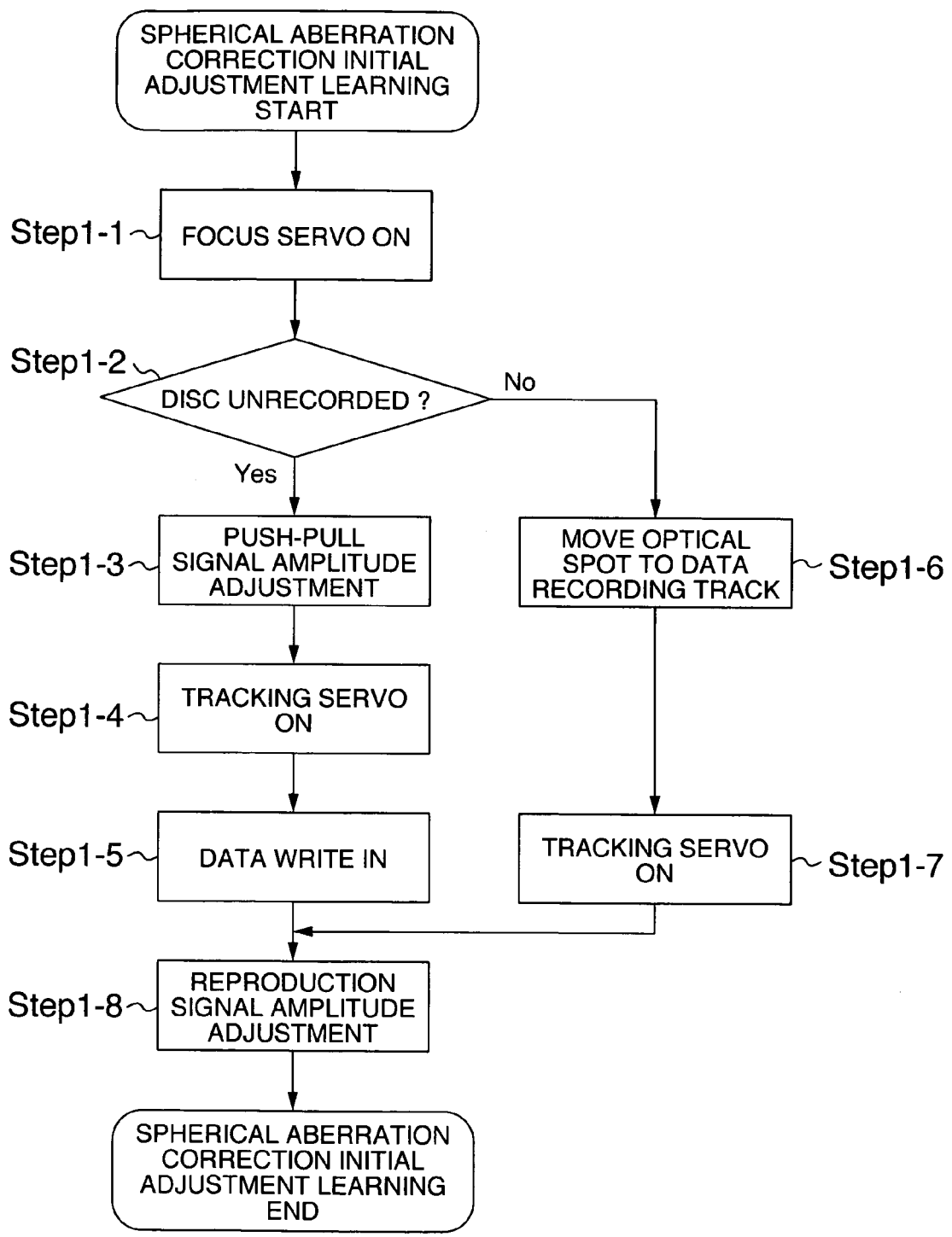
FIG. 5 is a flowchart showing an example of initial adjustment learning algorithm of the spherical aberration correction in the aforementioned optical disc recording/reproduction device.

That is, in FIG. 5, after the step 1-1, the step 1-2 judges whether the optical disc mounted is an unrecorded disc or a recorded disc. As a result, if the disc mounted is judged to be a disc having no data ("Yes"), the step 1-3 performs the push-pull signal amplitude adjustment. Referring to flowcharts of FIG. 6 and FIG. 7, explanation will be given on a specific example for executing the spherical aberration correction and the initial adjustment of the focus offset on the optical disc having no data recorded in the push-pull signal amplitude adjustment.

It should be noted that the medium judgment (step 1-2) is executed prior to the aberration correction step which will be detailed below. Alternatively, it is also possible that the aberration correction step explained below includes the aforementioned medium judgment step before executing that step.

Figure 6:
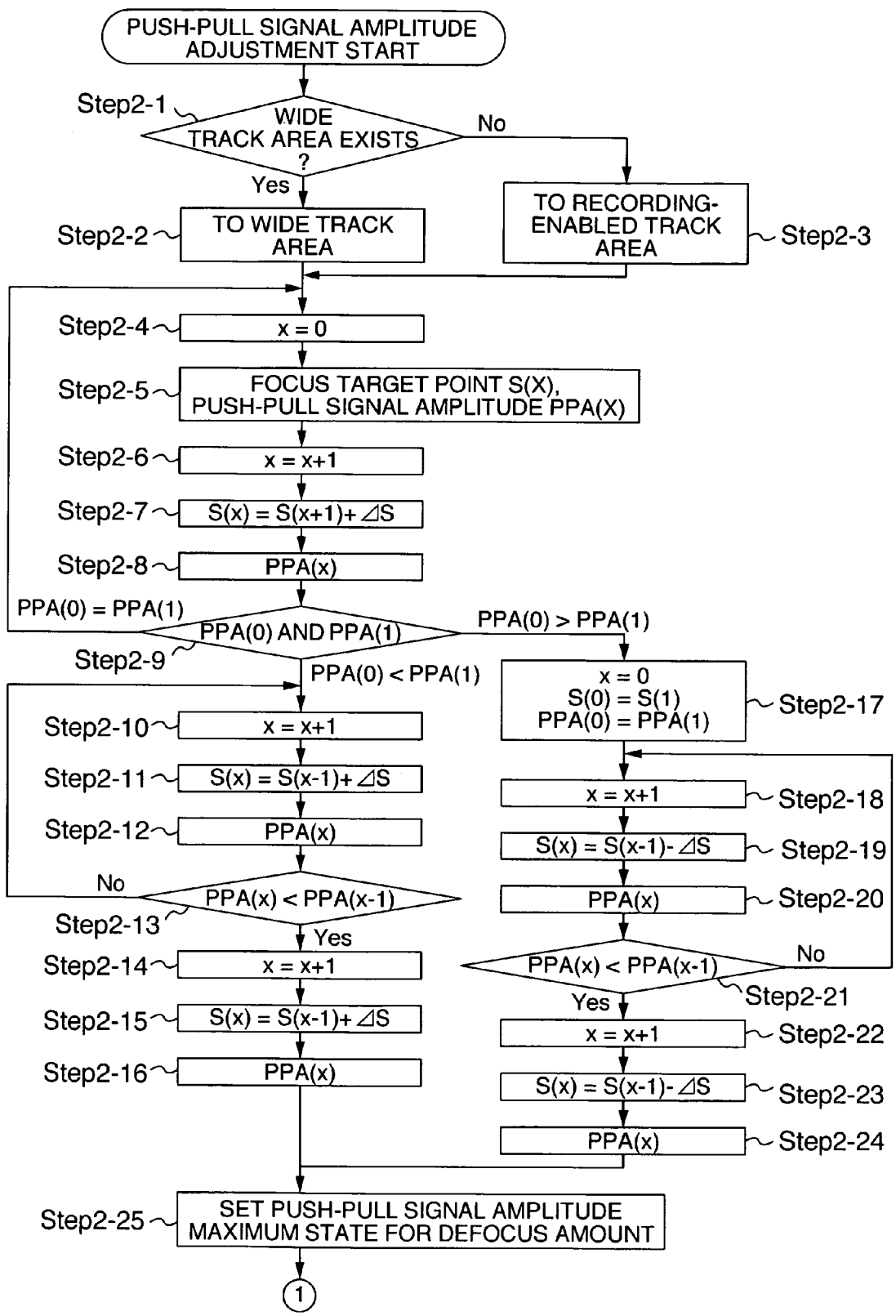
FIG. 6 is a flowchart (1/2) showing a detailed of the adjustment algorithm using the push-pull signal amplitude in the algorithm shown in FIG. 5.

As has been described above, if the step 1-2 of FIG. 5 judges that the disc has no data recorded ("Yes"), the process goes to the flowchart of FIG. 6. In FIG. 6, step 2-1 judges whether the optical disc has a continuous track area (hereinafter, referred to as a wide track area) having a track pitch multiplied by 1.05 to 2 as compared to the track pitch of the recording area where data is recorded, for example, like a high-frequency wobble area, the wide track area being assured by the amount equal to or more than the eccentric amount of eccentricity generated when the optical disc is rotated in the radial direction. It should be noted that "the high-frequency wobble area" is an area using the wobbling method appropriate for the case when that the track pitch is wider than the area where data is written, especially high-density disc (see JP-A-2003-123333).

If the aforementioned step 2-1 judges that the disc includes a wide track area, then go to step 2-2, where the optical spot is moved to that area. It should be noted that here, the optical spot is set at the center of the wide track area with respect to the radial direction so that it is not affected by other area by eccentricity.

On the other hand, if the aforementioned step 2-1 judges that the disc has no wide track area, then go to step 2-3, where the optical spot is moved to the track area where data is written (hereinafter, referred to as "a recording-enabled track area").

After the step 2-2 and step 2-3, in step 2-4, the variable x is set to 0, and in step 2-5, the defocus amount S(x) and the push-pull signal amplitude (x) in this state are measured.

Furthermore, in step 2-6, x is set to 1 and in step 2-7, defocus is performed in the out focus direction by $\Delta S$ (for example, 0.05 μm), after which step 2-8 measures the push-pull signal amplitude PPA(x).

In step 2-9, the PPA(0) and PPA(1) which have been measured are compared to each other. If the values of the PPA(0) and PPA(1) are almost identical (PPA(0)=PPA(1)), then back to the aforementioned step 2-4, and the aforementioned steps are repeated. It should be noted that the fact that the values of PPA(0) and the PPA(1) are almost identical means a case when the difference between them is 3% or below.

On the other hand, if the step 2-9 judges that the difference between the PPA(0) and the PPA(1) is 3% or above (PPA(0)≠PPA(1)) and PPA(0)<PPA(1), then go to step 2-10, where x=x+1 is set. In step 2-11, defocus is performed in the out focus direction by $\Delta S$, then, in step 2-12, the push-pull signal amplitude PPA(x) is measured and further, in step 2-13, it is judged whether PPA(x)<PPA(x−1).

If PPA(x)<PPA(x−1) is not satisfied in this step 2-13, then back to the step 2-10.

On the other hand, if PPA(x)<PPA(x−1) is satisfied, then go to step 2-14, where x=x+1 is set, and in step 2-15, defocus is performed in the out focus direction by $\Delta S$. Furthermore, in step 2-16, the push-pull signal amplitude PPA(x) is measured.

Moreover, if the aforementioned step 2-9 judges that the difference between the PPA(0) and the PPA(1) is 3% or above (RFA(0)≠RFA(1)) and PPA(0)>PPA(1), then go to step 2-17, where x=0, S(0)=A(1), PPA(0)=PPA(1) are set.

After this, in step 2-18, x=x+1 is set and then in step 2-19, defocus is performed in the in-focus direction by $\Delta S$. Furthermore, in step 2-20, the push-pull signal amplitude PPA(x) is measured and in step 2-21, it is judged whether PPA(x)<PPA(x−1).

If the inequality PPA(x)<PPA(x−1) is not satisfied in the step 2-21, then back to the step 2-18. On the other hand, if the aforementioned inequality is satisfied, x=x+1 is set in step 2-22 and defocus is performed in the in-focus direction by $\Delta S$ in step 2-23. Then, in step 2-24, the push-pull signal amplitude PPA(x) is measured.

After the step 2-16 and step 2-24, step 2-25 makes adjustment/setting so that the push-pull signal amplitude measured above becomes maximum for the defocus amount. By this, the flowchart of FIG. 6 terminates and goes to the flowchart of FIG. 7.

Figure 7:
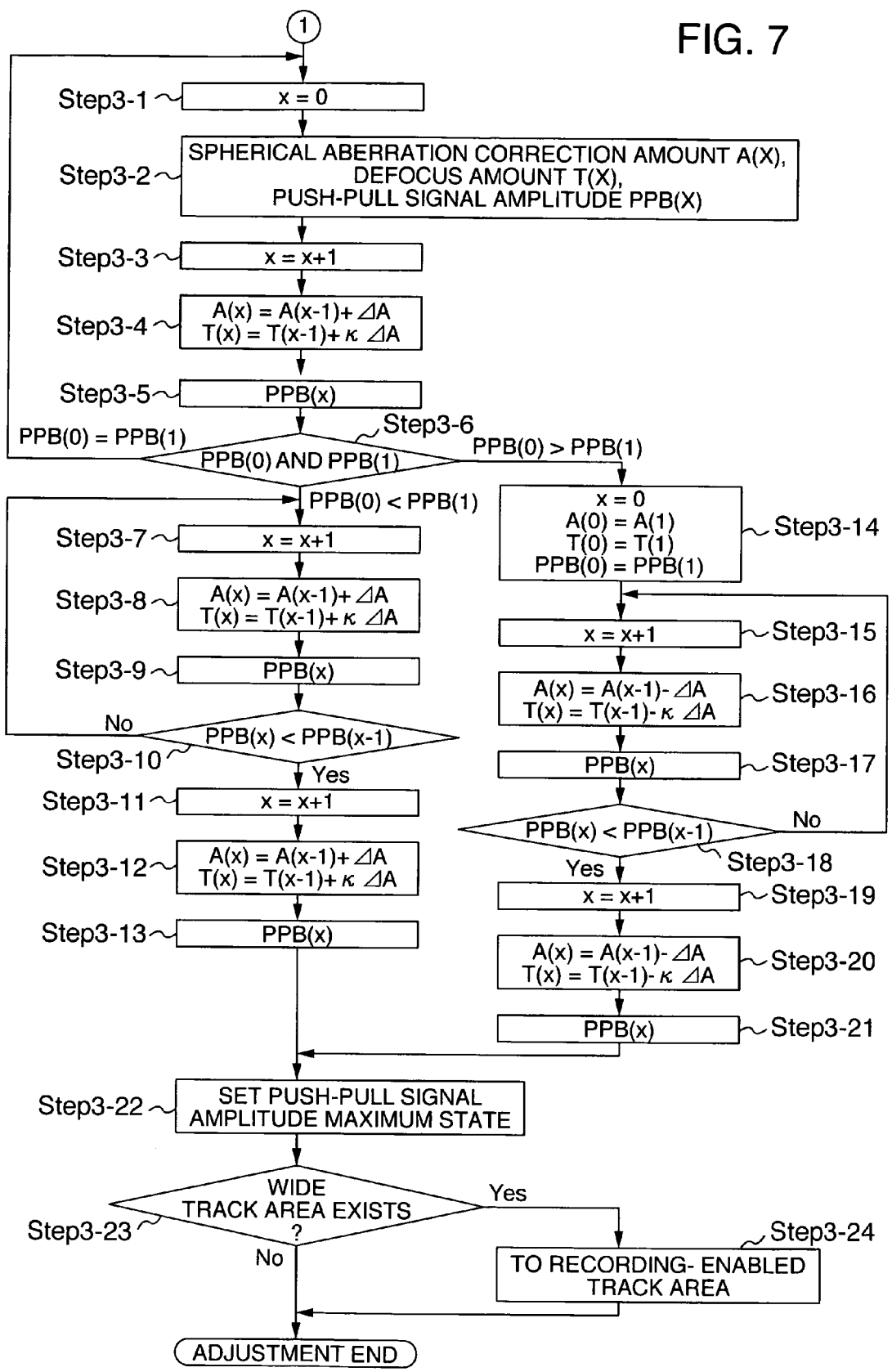
FIG. 7 is a flowchart (2/2) further showing a detailed of adjustment algorithm using the aforementioned push-pull signal amplitude.

Next, in step 3-1 in FIG. 7, x=0 is set. Then, step 3-2 measures the spherical aberration correction amount A(x), the defocus amount T(x), and the push-pull signal amplitude PPB(x). Furthermore, in step 3-3, x=1 is set. After this, in step 3-4, the spherical aberration correction amount $\Delta A$ (for example, 1.5 μm in the substrate thickness error calculation) is added by the spherical aberration corrector 110 and the defocus amount $\kappa \Delta A$ proportional to the correction amount $\Delta A$ is defocused. It should be noted that the "κ" is a proportional coefficient used when changing the defocus amount and the spherical aberration correction amount in the proportional relationship and indicates the inclination of the straight line LP2 in FIG. 4. Details of this "κ" will be detailed later. After this, in step 3-5, the push-pull signal amplitude PPB(x) is measured. Then, in step 3-6, the PPB(0) and the PPB(1) which have been measured above are compared to each other.

If the comparison results in that the difference between the PPB(0) and PPB(1) is 3% or below (PPB(0)=PPB(1)) in the step 3-6, then go to step 3-1 and the aforementioned steps are repeated similarly.

On the other hand, if the comparison in the step 3-6 results in that the difference between the PPB(0) and PPB(1) is 3% or above (PPB(0)≠PPB(1)) and PPB(0)<PPB(1), then go to step 308, where the spherical aberration correction amount $\Delta A$ is added by the spherical aberration corrector 110 and defocus is performed by the defocus amount $\kappa \Delta A$ proportional to the correction amount $\Delta A$. In step 3-9, the push-pull signal amplitude PPB(x) is measured. Then, step 3-10 judges whether PPB(x)<PPB(x−1) is satisfied.

If it is judged that the aforementioned inequality is not satisfied, then back to the step 3-7. On the other hand, if it is judged that the aforementioned inequality is satisfied, x=x+1 is set in step 3-11. Then, in step 3-12, the spherical aberration correction amount $\Delta A$ is added and defocus is performed by the defocus amount $\kappa \Delta A$ proportional to the correction amount $\Delta A$. Furthermore, in step 3-13, the push-pull signal amplitude PPB(x) is measured.

Moreover, when the aforementioned step 3-6 judges that the difference between the PPB(0) and PPB(1) is 3% or above and PPB(0)>PPB(1), control is passed to step 3-14, where x=, A(0)=A(1), T(0)=(T1), PPB(0)=PPB(1) are set. Then, in step 3-15, x=x+1 is set. In step 3-16, the spherical aberration correction amount—$\Delta A$ is added and defocus is performed by the defocus amount—$\kappa \Delta A$ proportional to the correction amount—$\Delta A$. Furthermore, in step 3-17, the push-pull signal amplitude PPB(x) is measured. After this, in step 3-18, it is judged whether PPB(x)<(PPB(x−1) is satisfied.

If the aforementioned step 3-18 judges that the aforementioned inequality is not satisfied, then back to step 3-15. On the other hand, if it is judged that the aforementioned inequality is satisfied, then go to step 3-19, where x=x+1 is set. In step 3-20, the spherical aberration correction amount—$\Delta A$ is added and defocus is performed by the defocus amount—$\kappa \Delta A$ proportional to the correction amount—$\Delta A$. In step 3-21, the push-pull signal amplitude PPB(x) is measured.

After the aforementioned step 3-13 and 3-21, further in step 3-22, the defocus amount and the spherical aberration correction amount are adjusted/set so that the push-pull signal amplitude is maximum. Furthermore, in step 3-23, it is judged whether the adjustment has been performed in the wide track area. If Yes, then go to step 3-24, where the optical spot is moved to the recording-enabled track area, thereby terminating the adjustment.

That is, by the steps detailed by using FIG. 6 and FIG. 7, the step 1-3 of "the push-pull signal amplitude adjustment" shown in the flowchart in FIG. 5 is completed. It should be noted that according to the aforementioned process, for example, in the characteristic diagram of the reproduction signal amplitude associated with the spherical aberration correction amount and the defocus amount of the push-pull signal amplitude shown in FIG. 3, if the spherical aberration correction amount and the defocus amount are moved on the straight lines LP1 and LRP in this order, this is equivalent to search of the maximum value of the push-pull signal amplitude obtained.

Subsequently, referring to the flowchart of FIG. 8, explanation will be given on the method for performing adjustment/setting so that the push-pull signal amplitude becomes maximum with respect to the defocus amount or the defocus amount and the spherical aberration correction amount in the step 2-25 of FIG. 6 and in the step 3-22 of FIG. 7.

Figure 8:
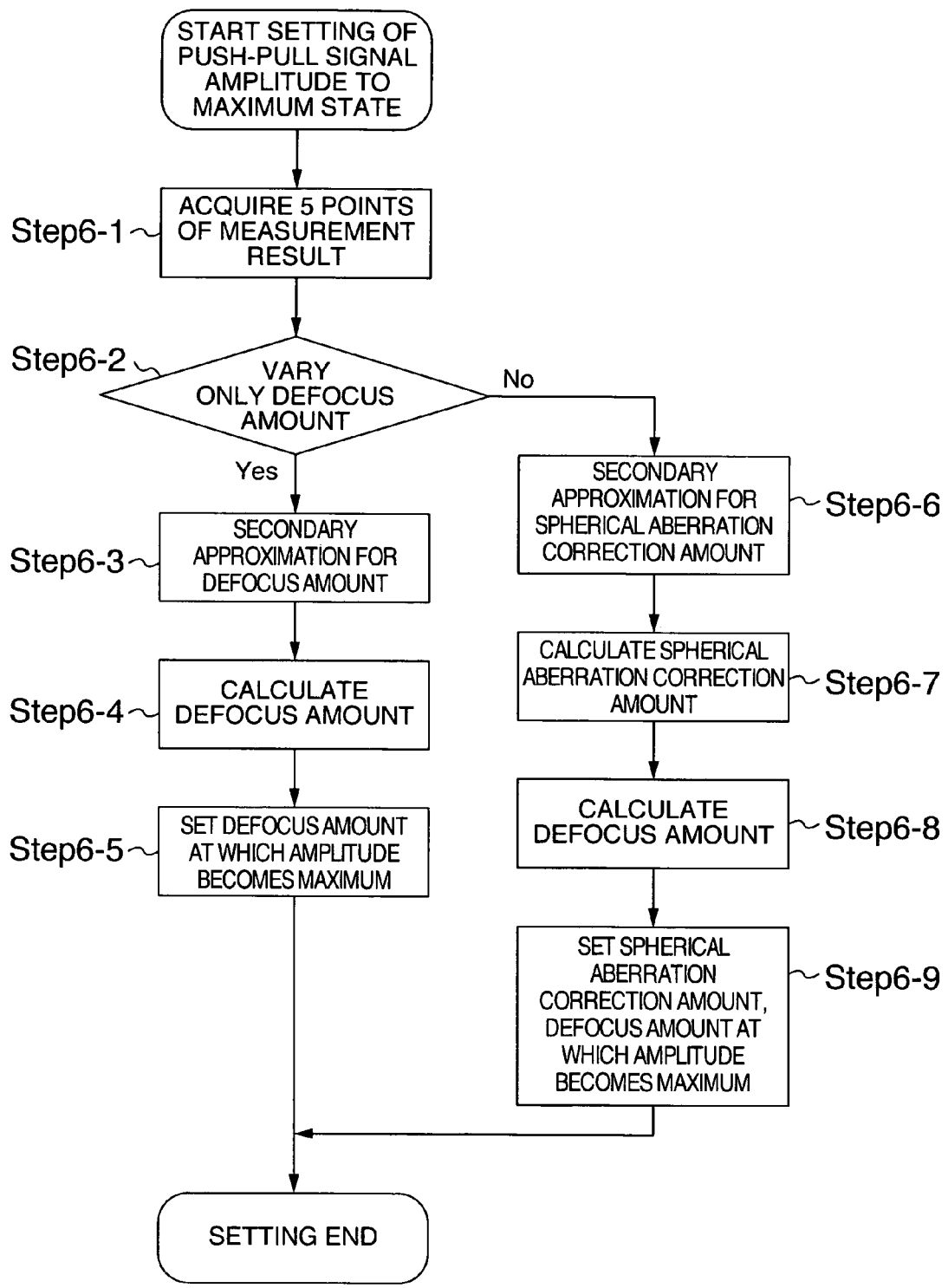
FIG. 8 is a flowchart showing detailed of a learning algorithm for setting the push-pull signal amplitude in FIG. 6 and FIG. 7 to the maximum state.

Firstly, in the case of step 2-25 in FIG. 6, step 6-1 of FIG. 8 extracts data on five points around the maximum value S(x−4) to S(x) and PPA(x−4) to PPA(x) from the push-pull signal amplitude measurement data. However, if x=3, S(0) to S(3) and PPA(0) to PPA(3) are sufficient.

Next, in step 6-2, it is judged whether to calculate the maximum value associated with only the defocus amount. More specifically, it is judged whether only the defocus amount has changed in the aforementioned adjustment. If Yes, then go to step 6-3.

That is, in step 6-3, approximation is performed for the defocus amount. According to the data extracted, secondary approximation is performed for the defocus amount. Step 6-4 calculates the defocus amount at which the push-pull signal amplitude becomes maximum. The defocus amount obtained is set to the defocus amount at which the push-pull signal amplitude becomes maximum in step 6-5, thereby terminating the process.

On the other hand, in the case of the step 3-22 of FIG. 7, firstly, in the same way as the aforementioned, step 6-1 extracts data on five points around the maximum value S(x−4) to S(x) and PPB(x−4) to PPB(x) from the push-pull signal amplitude measurement data. After this, the step 6-2 judges whether to calculate the maximum value associated with only the defocus value. However, in this case, in addition to the defocus amount, the spherical aberration correction amount is also to be calculated and the judgment is "No".

After this, step 6-6 performs secondary approximation about the spherical aberration correction amount according to the five data and step 6-7 calculates the spherical aberration correction amount at which the push-pull signal amplitude becomes maximum. After this, step 6-8 calculates the defocus amount at which the push-pull signal amplitude becomes maximum according to the spherical aberration correction amount calculated. Then, step 6-9 sets the spherical aberration correction amount and the defocus amount at which the push-pull signal amplitude becomes maximum, thereby terminating the process. It should be noted that after the process shown in FIG. 8 is completed, the process goes back to the flowchart of FIG. 5 in any case.

That is, again in FIG. 5, according to "the push-pull signal amplitude adjustment start" process detailed above, even if the disc has no information written, the tracking servo is turned "ON" in the step 1-4 and the data write is enabled in the step 1-5. After completion of these processes, the reproduction signal amplitude adjustment can be performed by the data written in the step 1-8.

Furthermore, referring to the flowcharts of FIG. 9 and FIG. 10, detailed explanation will be given on the reproduction signal amplitude adjustment in the step 1-8 which is a process for performing the spherical aberration correction and the initial adjustment of the focus offset with respect to the optical disc by the reproduction signal amplitude.

Figure 9:
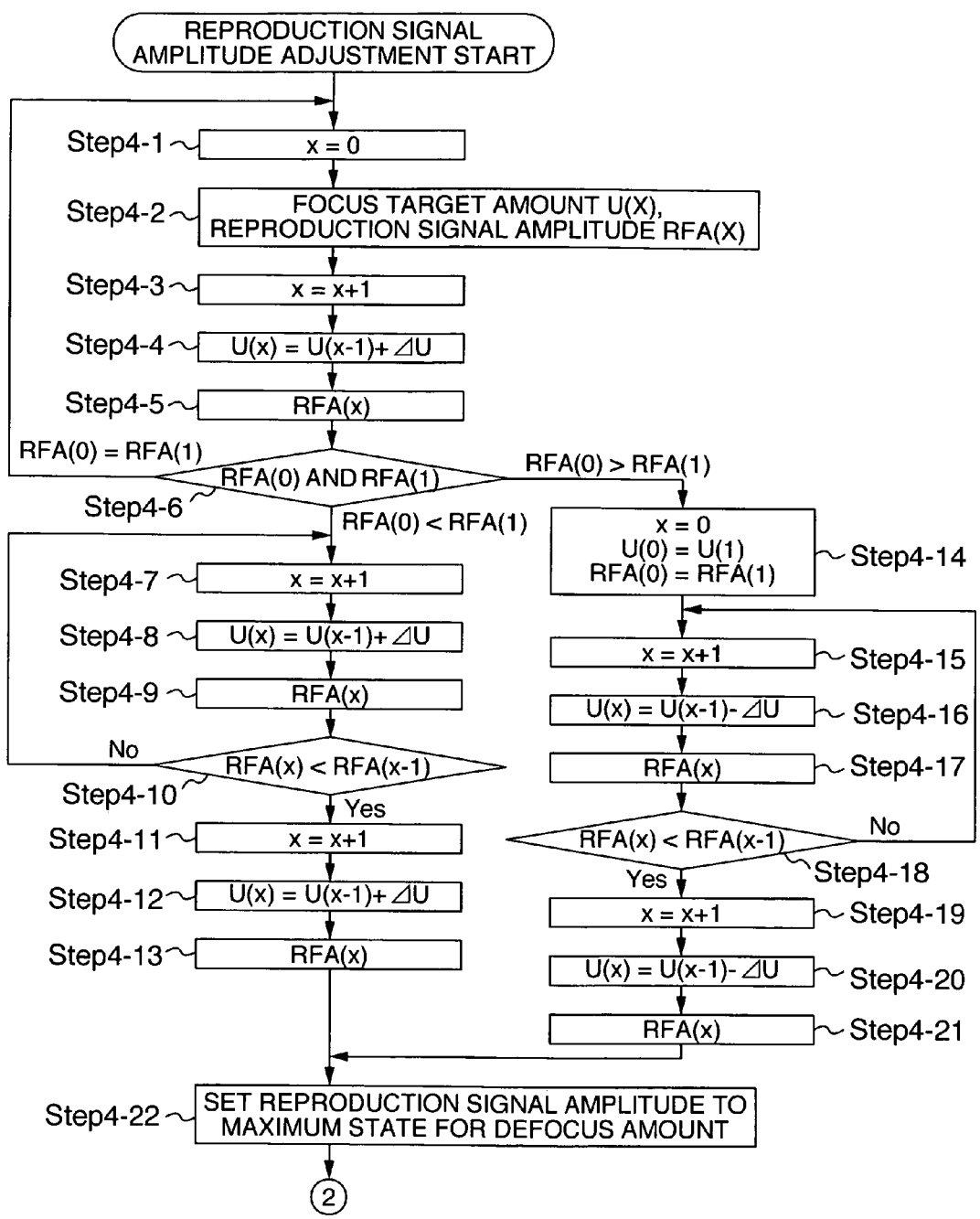
FIG. 9 is a flowchart (1/2) showing a detailed of an adjustment algorithm by the reproduction signal amplitude in the algorithm in FIG. 5.

Firstly, referring to FIG. 9, in step 4-1, x=0 is set and in step 4-2, the defocus amount U(x) and the reproduction signal amplitude RFA(x) are measured. Next, in step 4-3, x=1 is set and in step 4-4, defocus is performed in the out-focus direction by ΔU. After this, in step 4-5 the reproduction signal amplitude RFA(x) is measured. Then, in step 4-6, the RFA(0) measured is compared to the RFA(1) measured.

If the comparison results in that the difference between the RFA(0) and the RFA(1) is 3% or below (that is, RFA(0)=RFA(1)), then back to the step 4-1 and the same steps are repeated.

On the other hand, if the comparison in step 4-6 results in that the difference between the RFA(0) and the RFA(1) is 3% or above (RFA(0)≠RFA(1)) and RFA(0)<RFA(1), step 4-7 sets x=x+1 and step 4-8 performs defocus in the out-focus direction by ΔU. After this, in step 4-9, the reproduction signal amplitude RFA(x) is measured and step 4-10 judges whether RFA(x)<RFA(x−1).

If step 4-10 judges that the aforementioned inequality is not satisfied, then back to the step 4-7.

On the other hand, if step 4-10 judges that the aforementioned inequality is satisfied, then go to step 4-11, where x=x+1 is set and in step 4-12, defocus is performed in the out-focus direction by ΔU. After this, step 4-13 measures the reproduction signal amplitude RFA(x).

Moreover, if the aforementioned step 4-6 judges that the difference between the RFA(0) and the RFA(1) is 3% or above (RFA(0)≠RFA(1)) and RFA(0)>RFA(1), then go to step 4-14, where x=0, U(0)=U(1), RFA(0)=RFA(1) are set. Furthermore, in step 4-15, x=x+1 is set and in step 4-16, defocus is performed in the in-focus direction by ΔU. After this, step 4-17 measures the reproduction signal amplitude RFA(x) and step 4-18 judges whether RFA(x)<RFA(x−1).

If step 4-18 judges that the aforementioned inequality is not satisfied, then back to step 4-15.

On the other hand, if step 4-18 judges that the aforementioned inequality is satisfied, then go to step 4-19, where x=x+1 is set and in step 4-20 defocus is performed in the in-focus direction by ΔU. After this, step 4-21 measures the reproduction signal amplitude RFA(x).

After the aforementioned steps 4-13 and 4-21, further in step 4-22, the reproduction signal amplitude maximum state is set for the defocus amount. Thus, the flowchart of FIG. 9 is completed and the process goes to the flowchart of FIG. 10.

Figure 10:
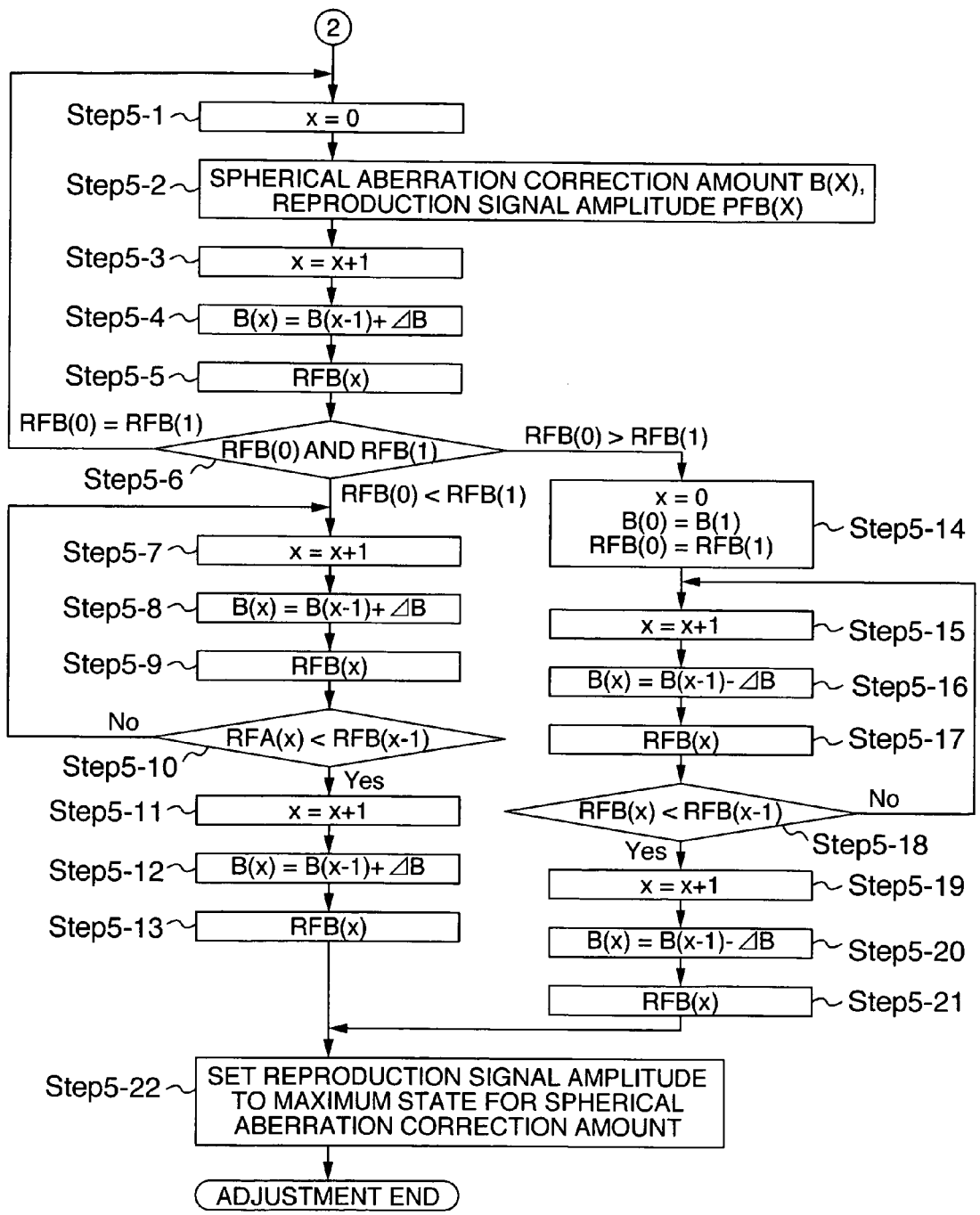
FIG. 10 is a flowchart (2/2) further showing a detailed of the adjustment algorithm by the aforementioned reproduction signal amplitude.

In FIG. 10, firstly, step 5-1 sets x=0 and step 5-2 measures the spherical aberration correction amount B(x) and the reproduction signal amplitude RFB(x). Furthermore, step 5-3 sets x=x+1 and step 5-4 adds the spherical aberration correction amount ΔB by the spherical aberration corrector. Then, in step 5-5, the reproduction signal amplitude RFB(x) is measured. After this, step 5-6 compares the RFB(0) and the RFB(1) which have been measured.

If the comparison in step 5-6 results in that the difference between the RFB(0) and the RFB(1) is 3% or below (RFB(0)=RFB(1)), then back to the aforementioned step 5-1, where the spherical aberration correction amount ΔB is added by the spherical aberration corrector and the aforementioned steps are repeated.

On the other hand, when the aforementioned step 5-6 results in that the difference between the RFB(0) and the RFB(1) is 3% or above (RFB(0)≠RFB(1)) and RFB(0)<RFB(1), further in step 507, x=x+1 is set and step 5-8 adds the spherical aberration correction amount ΔB by the spherical aberration corrector. After this, step 5-9 measures the reproduction signal amplitude RFB(x) and further step 5-10 judges whether RFB(x)<RFB(x−1).

If the aforementioned step 5-10 judges that the aforementioned inequality is not satisfied, then back to step 5-7.

On the other hand, if the step 5-10 judges that the aforementioned inequality is satisfied, then go to step 5-11 where x=x+1 is set and step 5-12 adds the spherical aberration correction amount ΔB by the spherical aberration corrector. Then, step 5-13 measures the reproduction signal amplitude RFB(x).

On the other hand, if the aforementioned step 5-6 judges that the difference between the RFB(0) and the RFB(1) is 3% or above (RFB(0)≠RFB(1)) and RFB(0)>RFB(1), the next step 5-14 sets x=0, B(0)=B(1), RFB(0)=RFB(1). After this, step 5-15 sets x=x+1 and step 5-16 adds the spherical aberration correction amount—ΔB by the spherical aberration corrector. Furthermore, step 5-17 measures the reproduction signal amplitude RFB(x) and step 5-18 judges whether RFB(x)<RFB(x−1).

It should be noted that if step 5-18 judges that the aforementioned inequality is not satisfied, then back to the step 5-15.

On the other hand, if it is judged that the aforementioned inequality is satisfied, further in step 5-19, x=x+1 is set and the subsequent step 5-20 adds the spherical aberration correction amount—ΔB by the spherical aberration corrector. After this, step 5-21 measures the reproduction signal amplitude RFB(x).

After the completion of the steps 5-13 and step 5-21, further in step 5-22, the reproduction signal amplitude maximum state is set for the spherical aberration correction amount.

That is, by the steps detailed by referring to FIG. 9 and FIG. 10, "the reproduction signal amplitude adjustment" (the step 1-8) shown in the flowchart of FIG. 5 is completed. It should be noted that the detailed steps mentioned above so called "the reproduction signal amplitude adjustment" mean equivalent execution to that the spherical aberration correction amount and the defocus amount are moved on the straight lines LR1 and LR2 in this order in FIG. 2 and the respective reproduction signal amplitude maximum values are searched.

Furthermore, hereinafter, detailed explanation will be given on the method executed in the aforementioned step 4-22 (FIG. 9) and the aforementioned step 5-22 (FIG. 10) for setting the state when the push-pull signal amplitude becomes maximum, with reference to the flowchart of FIG. 11.

Figure 11:
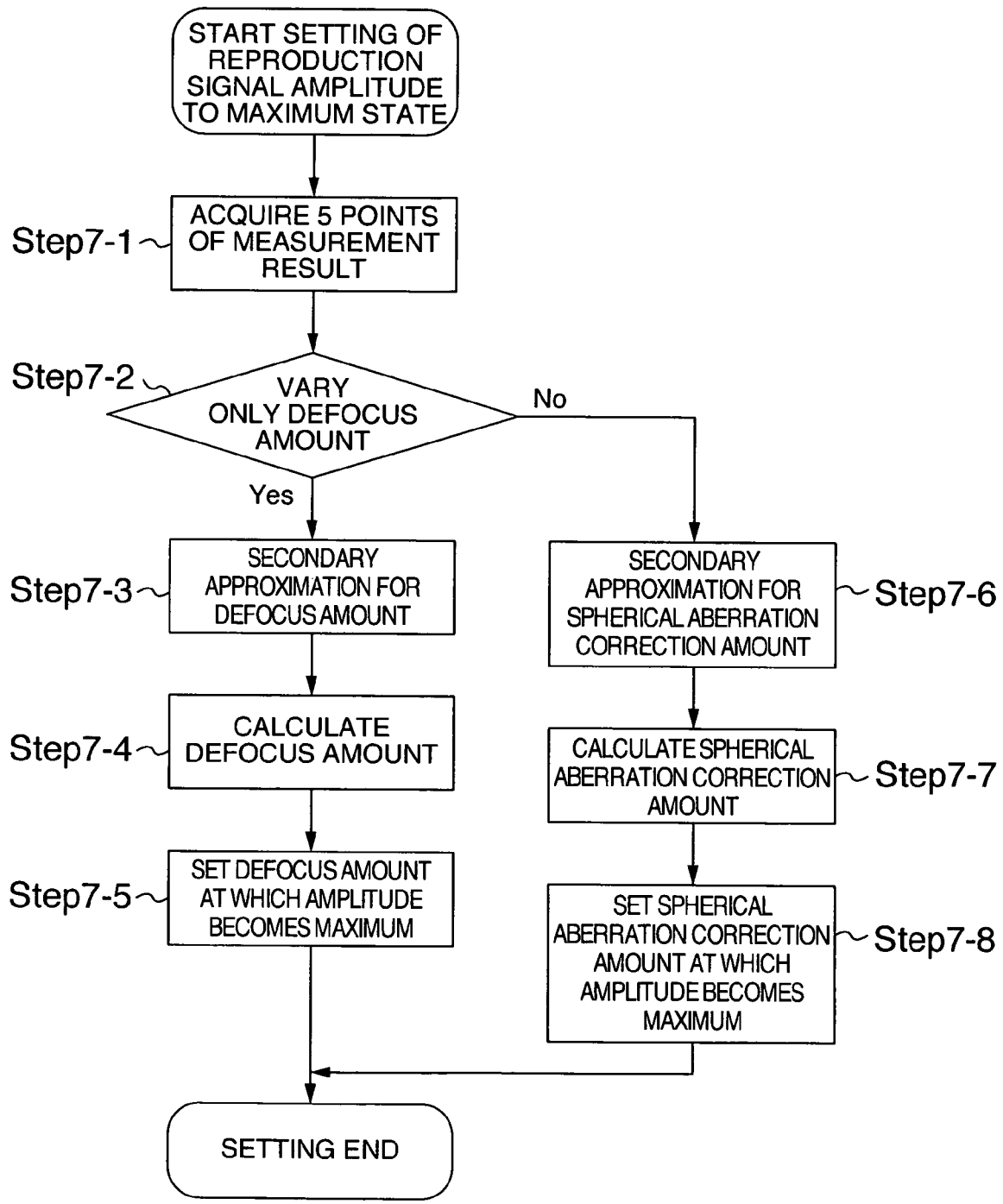
FIG. 11 is a flowchart showing a detailed of a learning algorithm for setting the reproduction signal amplitude in FIG. 8 and FIG. 9 to the maximum state.

Firstly, in the case of the step 4-22 of FIG. 9, i.e., when setting the reproduction signal amplitude to its maximum state for the defocus amount, step 7-1 of FIG. 11 extracts data on five points U(x−4) to U(x) and RFA(x−4) to RFA(x) around the maximum value from the reproduction signal amplitude measurement data. However, here also, when x=3, data on U(0) to U(3) and RFA(0) to RFA(3) are sufficient. Next, step 7-2 judges whether to calculate the maximum value for the defocus amount. It should be noted that in the same way as the aforementioned, the aforementioned adjustment judges whether only the defocus amount has been varied.

If Yes, approximation for the defocus amount is performed and then go to step 7-3, where the secondary approximation is performed for the defocus amount according to the data extracted. Furthermore, step 7-4 calculates the defocus amount at which the reproduction signal amplitude becomes maximum. Then, step 7-5 sets the defocus amount to the value where the reproduction signal amplitude becomes maximum, thereby terminating the process.

On the other hand, in the case of the step 5-22 of FIG. 10, i.e., when setting the reproduction signal amplitude to its maximum state for the spherical aberration correction amount, firstly, in the same way as the aforementioned, step 7-1 extracts data on five points B(x−4) to B(x) and RFB(x−4) to RFB(x) around the maximum value from the reproduction signal amplitude measurement data. After this, step 7-2 judges whether to calculate the maximum value for the defocus amount as has been described above. In this case, "No", since the approximation is performed for the spherical aberration correction. After this, step 7-6 performs secondary approximation of the extracted data for the spherical aberration correction amount and step 7-7 calculates the spherical aberration correction amount at which the reproduction signal amplitude becomes maximum. Then, step 7-8 sets the spherical aberration correction amount at which the reproduction signal amplitude becomes maximum, thereby terminating the setting process.

Thus, "the reproduction signal amplitude adjustment" (the step 1-8) in the flowchart of FIG. 5 is completed and the initial adjustment learning algorithm of the spherical aberration correction for the so-called non-recorded disc having not data recorded is terminated.

It should be noted that in the aforementioned explanation, the comparison step 2-9, step 3-6, step 4-6, step 5-6, 3% or below is used as a criterion for judging the measured amplitudes are identical. However, the present invention is not to be limited to this. According to the signal amplitude detection unit accuracy or the like, the criterion may be, for example, 5% or below or 1% or below. In addition to this, the step 6-1 and step 7-1 for acquiring the measurement results indicated in FIG. 11 have been explained as acquisition of data on five or four data around the maximum value from the measurement data. However, the number of the acquisition data is not to be limited to this. For example, the number may be three or below or six or above. Furthermore, in the step 6-6 and step 7-6 indicated in FIG. 8 and FIG. 11, for the acquired measurement data, secondary approximation is performed to obtain the maximum value. However, the present invention is not to be limited to this. It is possible to employ any method that can obtain the condition when the push-pull signal amplitude and/or the reproduction signal amplitude become maximum from the measurement data.

It should be noted that as has been described above, as for the aberration correction steps when the mounted disc contained data recorded, in the flowchart of FIG. 5, the processing of step 1-1 is performed firstly, and step 1-2 judges whether the disc is non-recorded. The judgment result is "No". For the optical disc judged to be a recorded disc, the step 1-6 and step 1-7 are performed instead of the aforementioned steps for the non-recorded disc (i.e., "the push-pull signal amplitude adjustment" step 1-3, "the tracking servo ON" step, and "the data write in" step 1-5). After this, in step 1-8, the same process as the step after writing data onto the unrecorded disc is performed.

Furthermore, in the aforementioned explanation for the step 3-3, step 3-8, step 3-15 shown in FIG. 7, it has been explained that defocus is performed for the spherical aberration correction amount A by the defocus amount κA. Hereinafter, explanation will be given on this κ with reference to FIG. 12.

Figure 12:
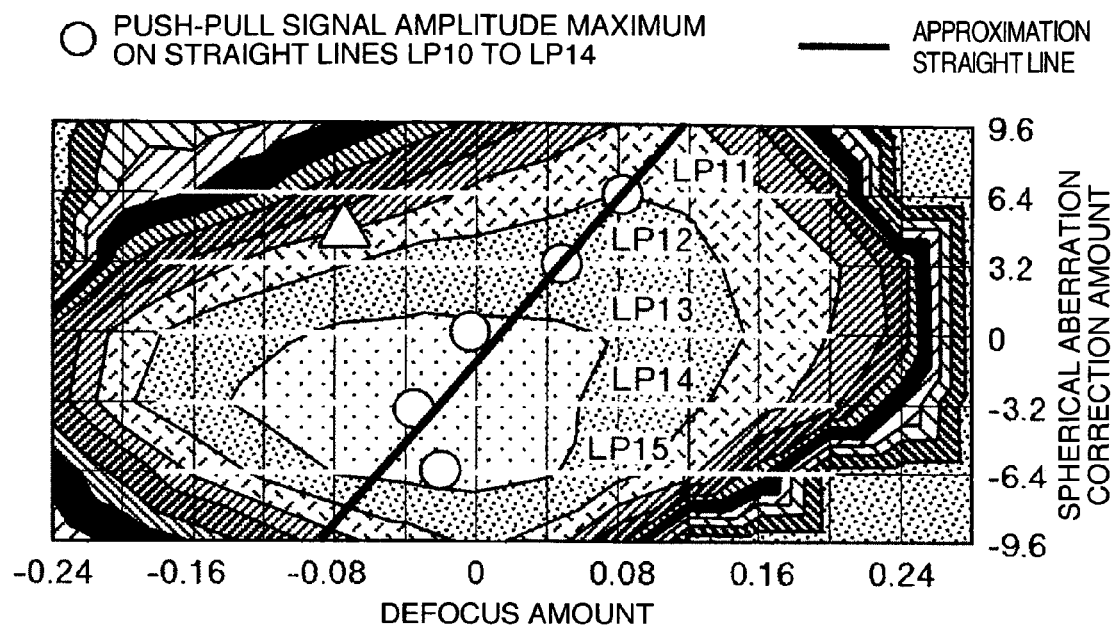
FIG. 12 shows amplitude characteristic curves of the push-pull signal associated with the defocus amount and the spherical aberration correction amount for explaining the inclination κ of the straight line in the aforementioned learning algorithm.

That is, in the push-pull signal amplitude characteristic curves (profile) associated with the defocus amount and the spherical aberration amount in FIG. 12, as shown by white straight lines LP11, LP12, LP13, LP14, LP15, it is possible to search the defocus amount at which the push-pull signal amplitude becomes maximum for each spherical aberration correction amount. From this search result, an approximation curve is created by the method of least square and the inclination of the straight line is made κ. That is, this κ indicates the inclination of the defocus amount for the spherical aberration correction amount of the straight line LP2 in FIG. 4.

In this invention, this inclination κ is calculated by utilizing the disc serving as a reference before shipment of the optical disc recording/reproduction device, and it is suggested that this calculated κ is applied to all the discs having the identical track pitch. That is, in this case, κ is recorded in the optical disc recording/reproduction device in advance and there is not need of performing a process to obtain this κ each time an optical disc is set in the optical disc reproduction device.

It should be noted that this κ should be set for each track pitch of the area where the optical spot is collected when performing adjustment by the push-pull signal amplitude. Accordingly, this κ should be recorded for each track pitch of the track area where the aforementioned adjustment of the present invention is performed for the all the optical disc media of the optical disc recording/reproduction device.

Moreover, the aforementioned κ can be effectively obtained by setting κ' as a reference when performing adjustment before shipment and searching the defocus amount at which the push-pull signal amplitude becomes maximum on the aforementioned straight lines LP11 to LP15 according to this κ'. Alternatively, there is a method for setting the latest κ to κ' each time calculating κ without fixing κ' or a method for setting the average value of the κ calculated to κ'.

Hereinafter, a modified example will be explained.

Firstly, in the modified example 1, the configuration of the optical disc recording/reproduction device is similar to the aforementioned embodiment as shown in FIG. 1. Moreover, the basic algorithm of adjustment learning executed in this device is also similar to the one shown in FIG. 5.

However, in this modified example 1, unlike the aforementioned embodiment where the proportion coefficient κ is set before shipment of the device and once set, it is not changed. On the contrary in this modified example 1, this κ is calculated during the aforementioned adjustment. It should be noted that this proportion coefficient κ is calculated in "the push-pull signal amplitude adjustment" step 1-3 of FIG. 5 as follows.

Figure 13:
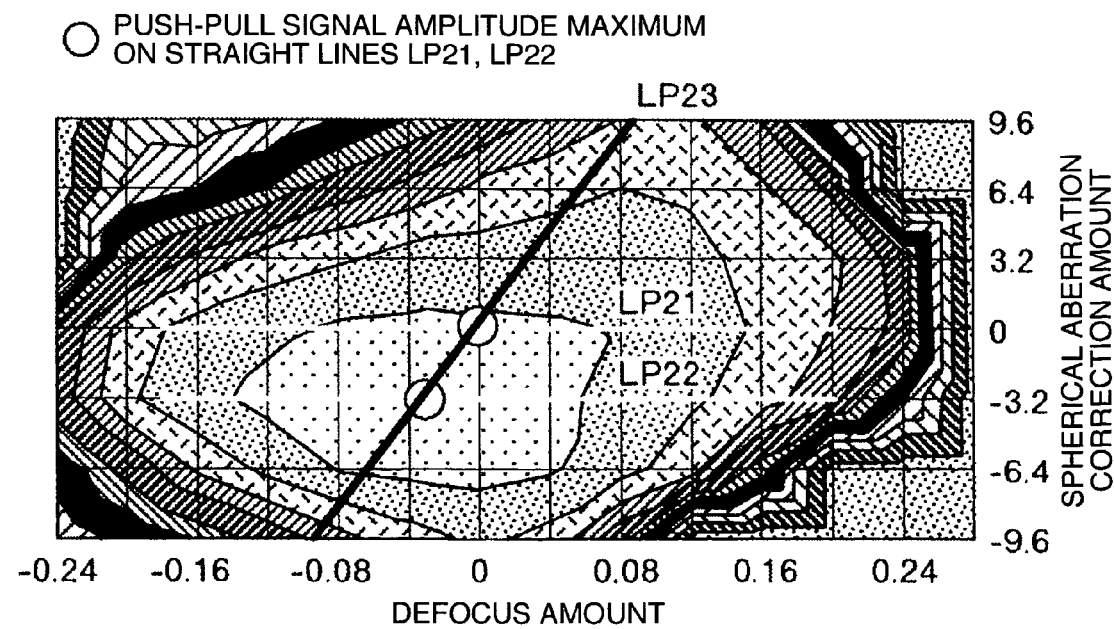
FIG. 13 shows amplitude characteristic curves of the push-pull signal associated with the defocus amount and the spherical aberration correction amount for explaining the calculation method of the inclination κ in a modified example 1 of the present invention.

Explanation will be given on the calculation of this proportion coefficient κ with reference to FIG. 13. Here, firstly, as the first step, as shown by the white straight line LP21 in FIG. 13, the defocus amount at which the push-pull signal amplitude becomes maximum at a certain spherical aberration correction state is searched. Next, as the second step, as shown by the white straight line LP22, in a state that a spherical aberration correction amount other than the first step 1 is added, the defocus amount at which the push-pull signal amplitude becomes maximum is searched. After this, as the third step, a straight line LP23 passing through the two maximum states obtained in the first step and the second step is obtained and its inclination is made κ.

By this, the process of the step 2-4 to the step 2-25 shown in FIG. 6 is performed twice for the different spherical aberration correction amounts, the defocus amount at which the push-pull signal amplitude becomes maximum on each of the straight lines is searched, and then a straight line passing through them is calculated, and the aforementioned κ is calculated. For the second time, setting is performed so that the push-pull signal amplitude is maximum and by using the κ, the process of the flowchart of FIG. 7 is performed.

Thus, when the method of the modified example 1 is used, by comparing the maximum values of the push-pull signal amplitudes on the straight lines LP21 and LP22, it is possible to know the direction of the spherical aberration correction in which the push-pull signal amplitude increases. For this, when searching the maximum value in the processes of the steps 3-1 to 3-22 shown in FIG. 7, the spherical aberration correction amount and the defocus amount are adjusted to the greater one among the maximum values obtained in the first step and the second step. That is, this eliminates the useless steps of adjustment of the spherical aberration correction amount and the defocus amount in one direction and then in the opposite direction (i.e., in the steps 3-16 to 3-21, the push-pull signal amplitude PPB is calculated by replacing κΔA by −κΔA).

Furthermore, in the embodiment detailed above, especially in the "push-pull signal amplitude adjustment" step 1-3 shown in FIG. 5, before proportionally adjusting the spherical aberration correction amount and the defocus amount, the spherical aberration correction amount is fixed and the state when the push-pull signal amplitude becomes maximum is searched only by adjusting the defocus amount (see the process in FIG. 6).

However, in the modified example 2 explained below, the state when the push-pull signal amplitude becomes maximum is searched only by adjusting the spherical aberration correction amount and then the spherical aberration correction amount and the defocus amount are proportionally adjusted.

Figure 14:
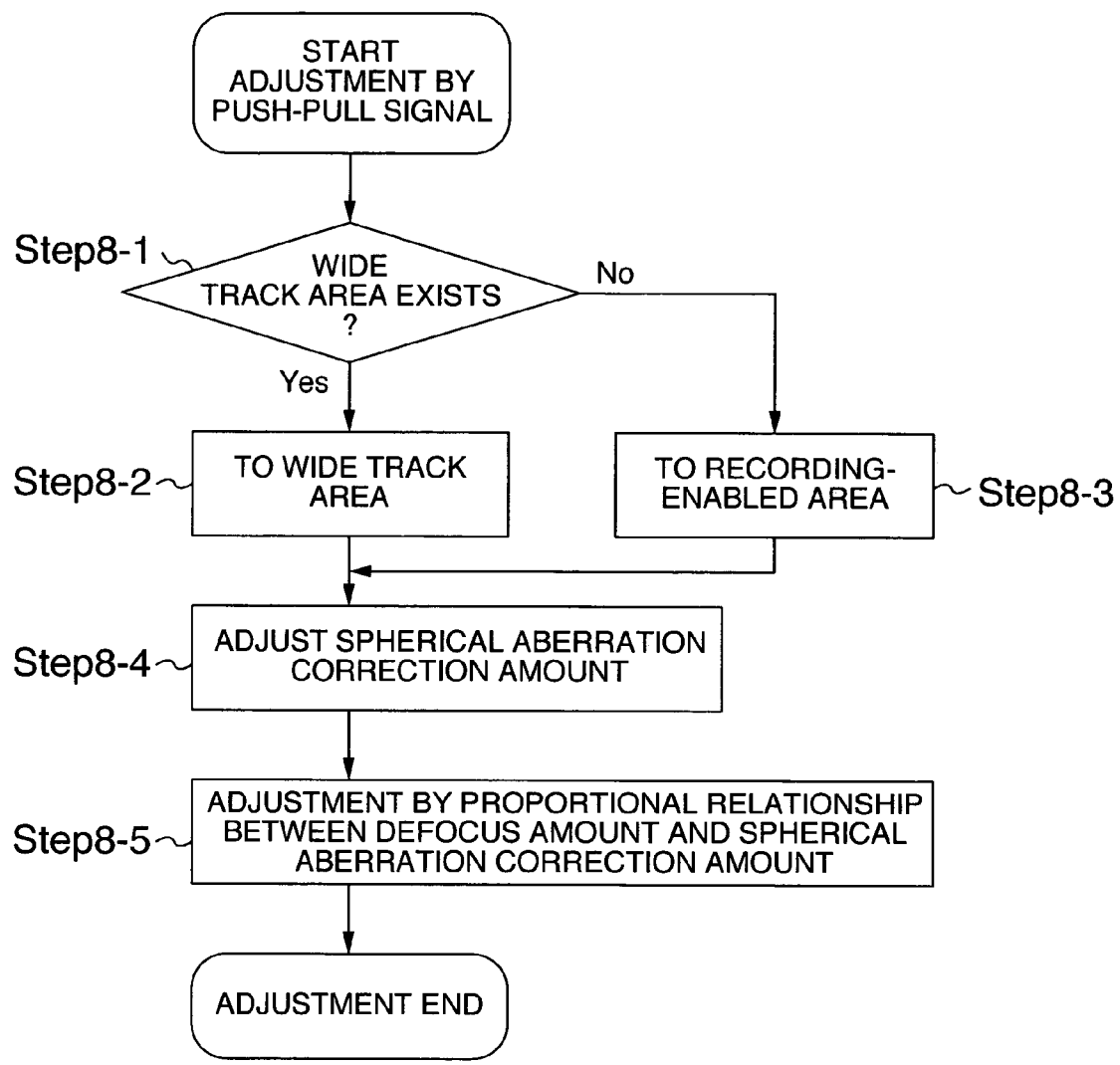
FIG. 14 is flowchart showing an adjustment algorithm by the push-pull signal in a modified example 2 of the present invention.

That is, in the modified example 2, as shown in the flowchart of FIG. 14, step 8-1 judges the medium and then judges whether a wide track area is present. If the wide track is present (Yes), in step 8-2, the optical spot is moved to the wide track area. On the other hand, if no wide track is present (No), the process goes to step 8-3, where the optical spot is moved to the recording-enabled track area. After this, in step 8-4, the defocus amount is fixed and the state when the push-pull signal becomes maximum is obtained only by adjusting the spherical aberration correction amount. Then, in step 8-5, the defocus amount is calculated by utilizing the proportional relationship between the defocus amount and the spherical aberration correction amount. Thus, the spherical aberration correction amount and the defocus amount are simultaneously adjusted.

That is, the aforementioned inclination κ can easily be obtained by fixing the defocus amount, searching the spherical correction amount at which the push-pull signal amplitude becomes maximum, and repeating the search twice or more. More specifically, by exchanging the relationship between the defocus amount and the spherical aberration correction amount in the aforementioned embodiment and the modified example 1 the inclination can easily be obtained.

Moreover, for the optical disc having data recorded also, the order of adjustments of the spherical aberration correction amount and the defocus amount are changed, i.e., as shown in the flowchart of FIG. 15, the spherical aberration correction amount is adjusted in step 9-1 and then the defocus amount is adjusted in step 9-2.

As has been detailed above, according to the present invention, the optical recording/reproduction device includes: an optical pickup including an objective lens for collecting light flux onto an optical disc and forming an optical spot, a photodetector for detecting a light flux reflected from the optical disc, an actuator for setting the objective lens either to an in-focus state, i.e., moving the objective lens toward the optical disc or an out-focus state, i.e., moving the objective lens apart from the optical lens, and an optical pick up having a spherical aberration corrector for correcting a spherical aberration; means for generating a reproduction signal serving as data and a tracking error signal from an output signal from the photo-detector by the push-pull method; means for detecting amplitudes of the reproduction signal and tracking error signal; spherical aberration corrector drive means for driving the spherical aberration corrector; actuator drive means for driving the actuator; recording state judgment means for judging whether the optical is in an unrecorded state containing no data recorded or in a recorded state containing data recorded; and system control means for controlling the aforementioned means. The spherical aberration correction and focus offset adjustment learning are performed from the fluctuation pattern of the amplitudes of the reproduction signal and the tracking error signal obtained by driving the actuator to move the objective lens so as to change the focus offset state and driving the spherical aberration corrector so as to change the spherical aberration correction state.

Moreover, in the optical disc recording/reproduction device according to the present invention, for an optical disc which has been judged to be a recorded disc by the optical disc recording state judgment means, the focus offset and the spherical aberration correction are adjusted by using the amplitude information on the reproduction signal to which the tracking servo is applied so that the optical spot follows the track having the data (i.e., "the reproduction signal amplitude adjustment" is performed).

Moreover, in the optical disc recording/reproduction device according to the present invention, for an optical disc which has been judged to be an unrecorded disc by the optical disc recording state judgment means, the focus offset and the spherical aberration correction are adjusted by using the amplitude information on the tracking error signal to which the tracking servo is not applied (i.e., "the push-pull signal amplitude adjustment" is performed).

In the optical disc recording/reproduction device according to the present invention, for an optical disc which is judged to be a recorded disc by the optical disc recording state judgement means, the push-pull signal amplitude adjustment is performed.

In the optical disc recording/reproduction device according to the present invention, for an optical disc which is judged to be a recorded disc by the optical disc recording state judgement means, the push-pull signal amplitude adjustment is performed, after which data is recorded on the optical disc and further the reproduction signal amplitude adjustment is performed by using the amplitude information on the reproduction signal of the data.

In the optical disc recording/reproduction device according to the present invention, for an optical disc which is judged to be an unrecorded disc by the optical disc recording state judgement means, the push-pull signal amplitude adjustment is performed, after which data is recorded on the optical disc and further the reproduction signal amplitude adjustment is performed by using the amplitude information on the reproduction signal of the data.

In the optical disc recording/reproduction device according to the present invention, when in addition to the track area for recording data onto the optical disc medium (i.e., "recording-enabled track area") which is set to the optical disc recording/reproducing device, there is a separate track area of a track pitch multiplied by 1.05 to 2 as compared to the track pitch of the recording-enabled track (i.e., "wide track area") which is set to the optical disc recording/reproducing device, the push-pull signal amplitude adjustment is performed in the wide track area.

In the optical disc recording/reproduction device according to the present invention, when detecting an amplitude of the tracking error signal in adjusting the push-pull signal amplitude, the tracking pitch is constant and detection of the tracking error signal amplitude over areas having different track pitch during the push-pull signal amplitude adjustment is not performed.

In the optical disc recording/reproduction device according to the present invention, the optical spot is focused to the recording-enabled track area and the push-pull signal amplitude adjustment is performed.

In the optical disc recording/reproduction device according to the present invention, when performing the push-pull signal amplitude adjustment, the optical sport is moved to almost center of the area having the same track pitch of the optical disc in the radial direction for performing the push-pull signal amplitude adjustment.

In the optical disc recording/reproduction device according to the present invention, the reproduction signal amplitude adjustment includes: a first process for moving the objective lens in the focus direction to search the focus offset amount at which the reproduction signal amplitude becomes maximum and setting the focus offset state; a second process for moving the spherical aberration corrector to search a spherical aberration correction amount at which the reproduction signal amplitude becomes maximum and setting the spherical aberration correction state; and a third process for moving both of the objective lens and the spherical aberration corrector by a predetermined method to search the focus offset amount and the spherical aberration correction amount at which the reproduction signal amplitude becomes maximum and setting the focus offset state and the spherical aberration correction state. In this adjustment method, at least two processes of the first to the third process are performed so as to search the focus offset amount and the spherical aberration correction amount at which the reproduction signal amplitude becomes maximum and set the focus offset state and the spherical aberration correction state.

In the optical disc recording/reproduction device according to the present invention, the reproduction signal amplitude adjustment includes: a first process for moving the objective lens in the focus direction to search the focus offset amount at which the reproduction signal amplitude becomes maximum and setting the focus offset state; a second process for moving the spherical aberration corrector to search a spherical aberration correction amount at which the push-pull signal amplitude becomes maximum and setting the spherical aberration correction state; and a third process for moving both of the objective lens and the spherical aberration corrector by a predetermined method to search the focus offset amount and the spherical aberration correction amount at which the push-pull signal amplitude becomes maximum and setting the focus offset state and the spherical aberration correction state. In this adjustment method, at least two processes of the first to the third process are performed so as to search the focus offset amount and the spherical aberration correction amount at which the push-pull signal amplitude becomes maximum and set the focus offset state and the spherical aberration correction state.

In the optical disc recording/reproduction device according to the present invention, in the third process, the focus offset amount and the spherical aberration correction amount are moved by the proportion relationship using a predetermined proportional coefficient so as to search the focus offset amount and the spherical aberration correction amount at which the reproduction signal amplitude becomes maximum.

In the optical disc recording/reproduction device according to the present invention, in the third process, the focus offset amount and the spherical aberration correction amount are moved by the proportion relationship using a predetermined proportional coefficient so as to search the focus offset amount and the spherical aberration correction amount at which the push-pull signal amplitude becomes maximum.

In the optical disc recording/reproduction device according to the present invention, the proportion coefficient of the proportional relationship is calculated by performing the first process at least twice with different spherical aberration correction states and performing straight line approximation by the least square method for the correction amount of the spherical aberration correction state and the focus offset amount searched by the first process so as to obtain the inclination of the approximation straight line.

In the optical disc recording/reproduction device according to the present invention, the proportion coefficient of the proportional relationship is calculated by performing the second process disclosed in claim 10 at least twice with different focus offset states and performing the straight line approximation by the least square method for the focus offset state and the spherical aberration correction amount searched by the second process so as to obtain the inclination of the approximation straight line.

In the optical disc recording/reproduction device according to the present invention, the proportion coefficient of the proportional relationship is calculated by performing the second process at least twice with different focus offset states and performing the straight line approximation by the least square method for the focus offset state and the spherical aberration correction amount searched by the second process so as to obtain the inclination of the approximation straight line.

In the optical disc recording/reproduction device according to the present invention, the initial value of the proportion coefficient is set for each track pitch of the area of the optical disc for focusing the optical spot when performing the third process.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc recording/reproduction device comprising:

an optical pickup having an objective lens for collecting light flux onto an optical disc and forming an optical spot, a photo-detector for detecting a light flux reflected from the optical disc, an actuator for moving the objective lens, and a spherical aberration corrector for correcting a spherical aberration of the objective lens;

means for generating a reproduction signal and a tracking error signal serving as data from an output signal from the photo-detector of the optical pickup;

spherical aberration corrector drive means for driving the spherical aberration corrector of the optical pickup; and actuator drive means for driving the actuator of the optical pickup;

wherein the tracking error signal generation means is adapted to be able to at least generate the tracking error signal by a push-pull signal based on the push-pull method;

the optical disc recording/reproduction device further comprising:

first adjustment means for adjusting a spherical aberration correction amount in the spherical aberration corrector of the optical pickup and a focus offset amount of the objective lens according to the tracking error signal formed by the push-pull signal;

second adjustment means after adjustment of the spherical aberration and the focus offset by the first adjustment means, for recording predetermined data on the optical disc and adjusting the spherical aberration correction amount in the spherical aberration corrector of the optical pickup and the focus offset amount of the objective lens according to the reproduction signal of the data recorded; and means for storing characteristics for the defocus amount and the spherical aberration correction amount relating to the amplitude of the tracking error signal formed by the push-pull signal, so that the characteristic is used for adjustments of the spherical aberration and the focus offset by the first and the second adjustment means.

2. An optical disc recording/reproduction device as claimed in claim 1, further comprising means for judging whether the optical disc is an unrecorded disc or not, wherein when the optical disc is judged to be an unrecorded disc by the judging means, after the spherical aberration and focus offset adjustment by the fist adjustment means, predetermined data is recorded on the optical disc, and the second adjustment means adjusts the spherical aberration correction amount in the spherical aberration corrector of the optical pickup and the focus offset of the objective lens according to the reproduction signal of the recorded data.

3. An optical disc recording/reproduction device as claimed in claim 1, further comprising means for detecting amplitudes of the reproduction signal and the tracking error signal.

4. An optical disc recording/reproduction device as claimed in claim 3, wherein the first adjustment means adjusts the spherical aberration correction amount in the spherical aberration corrector of the optical pickup and the focus offset amount of the objective lens so that the amplitude of the tracking error signal formed by the push-pull signal detected by the amplitude detection means becomes maximum.

5. An optical disc recording/reproduction device as claimed in claim 3, wherein the second adjustment means adjusts the spherical aberration correction amount in the spherical aberration corrector of the optical pickup and the focus offset amount of the objective lens so that the amplitude of the reproduction signal of the data detected by the amplitude detection means becomes maximum.

6. An optical disc recording/reproduction device comprising:

an optical pickup having an objective lens for collecting light flux onto an optical disc and forming an optical spot, a photo-detector for detecting a light flux reflected from the optical disc, an actuator for moving the objective lens, and a spherical aberration corrector for correcting a spherical aberration of the objective lens;

means for generating a reproduction signal and a tracking error signal serving as data from an output signal from the photo-detector of the optical pickup;

spherical aberration corrector drive means for driving the spherical aberration corrector of the optical pickup; and actuator drive means for driving the actuator of the optical pickup;

wherein the tracking error signal generation means is adapted to be able to at least generate the tracking error signal by a push-pull signal based on the push-pull method;

the optical disc recording/reproduction device further comprising:

first adjustment means for adjusting a spherical aberration correction amount in the spherical aberration corrector of the optical pickup and a focus offset amount of the objective lens according to the tracking error signal formed by the push- pull signal; and second adjustment means after adjustment of the spherical aberration and the focus offset by the first adjustment means, for recording predetermined data on the optical disc and adjusting the spherical aberration correction amount in the spherical aberration corrector of the optical pickup and the focus offset amount of the objective lens according to the reproduction signal of the data recorded, wherein the first adjustment means is adapted to adjust the spherical aberration correction amount and the focus offset amount simultaneously by measuring the amplitude of the tracking error signal formed by the push-pull signal and/or the second adjustment means is adapted to adjust the spherical aberration correction amount and the focus offset amount simultaneously by measuring the reproduction signal along a predetermined profile of the optical disc, said profile indicating the spherical aberration correction amount with respect to the focus offset amount.

7. An optical disc recording/reproduction device as claimed in claim 1 wherein the characteristic corrects both the defocus amount and the spherical aberration amount according to the inclination of the straight line at which the amplitude of the tracking error signal formed by the push-pull signal becomes maximum.

8. An optical disc recording/reproduction device as claimed in claim 7, wherein the inclination is stored in the storage means before shipment of the device.

9. An optical disc recording/reproduction device as claimed in claim 7, further comprising a function for updating the inclination.

10. An optical disc recording/reproduction device comprising:

an optical pickup having an objective lens for collecting light flux onto an optical disc and forming an optical spot, a photo-detector for detecting a light flux reflected from the optical disc, an actuator for moving the objective lens, and a spherical aberration corrector for correcting a spherical aberration of the objective lens;

means for generating a reproduction signal and a tracking error signal serving as data from an output signal from the photo-detector of the optical pickup;

spherical aberration corrector drive means for driving the spherical aberration corrector of the optical pickup; and actuator drive means for driving the actuator of the optical pickup;

wherein the tracking error signal generation means is adapted to be able to at least generate the tracking error signal by a push-pull signal based on the push-pull method;

the optical disc recording/reproduction device further comprising:

first adjustment means for adjusting a spherical aberration correction amount in the spherical aberration corrector of the optical pickup and a focus offset amount of the objective lens according to the tracking error signal formed by the push-pull signal;

second adjustment means after adjustment of the spherical aberration and the focus offset by the first adjustment means, for recording predetermined data on the optical disc and adjusting the spherical aberration correction amount in the spherical aberration corrector of the optical pickup and the focus offset amount of the objective lens according to the reproduction signal of the data recorded; and means for detecting amplitudes of the reproduction signal and the tracking error signal, wherein the first adjustment means adjusts the spherical aberration correction amount in the spherical aberration corrector of the optical pickup and the focus offset amount of the objective lens so that the amplitude of the tracking error signal formed by the push-pull signal detected by the amplitude detection means becomes maximum, wherein when in addition to the track area for recording data onto the optical disc medium, there is a separate track area having 1.05 to 2 times track pitch than the track pitch of the track where the data is recorded, the first adjustment means performs adjustment in this separate track area.

* * * * *